(12) United States Patent
Yun et al.

(10) Patent No.: US 12,743,126 B2
(45) Date of Patent: Sep. 22, 2026

(54) WEARABLE ELECTRONIC DEVICE COMPRISING ANTENNA

(71) Applicant: SAMSUNG ELECTRONICS CO., LTD., Suwon-si (KR)

(72) Inventors: Heeyoung Yun, Suwon-si (KR); Kijung Kim, Suwon-si (KR); Hyunseok Chang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 327 days.

(21) Appl. No.: 18/533,793

(22) Filed: Dec. 8, 2023

(65) Prior Publication Data

US 2024/0103573 A1 Mar. 28, 2024

Related U.S. Application Data

(63) Continuation of application No. PCT/KR2022/009143, filed on Jun. 27, 2022.

(30) Foreign Application Priority Data

Jun. 28, 2021 (KR) ........................ 10-2021-0084297

(51) Int. Cl.
*G06F 1/16* (2006.01)
*H04B 1/3888* (2015.01)

(52) U.S. Cl.
CPC ............ *G06F 1/163* (2013.01); *G06F 1/1688* (2013.01); *H04B 1/3888* (2013.01)

(58) Field of Classification Search
CPC ...................................................... G04G 21/00
See application file for complete search history.

(56) References Cited

U.S. PATENT DOCUMENTS 7,933,123 B2 4/2011 Wang et al.
7,995,334 B2 8/2011 McClure et al.
8,345,414 B2 * 1/2013 Mooring ................ G06F 1/163 361/679.21

(Continued)

FOREIGN PATENT DOCUMENTS

CN 105652648 6/2016
CN 208570909 3/2019

(Continued)

OTHER PUBLICATIONS

Extended European Search Report dated Sep. 2, 2024 issued in European Patent Application No. 22833545.1.

(Continued)

*Primary Examiner* — Wen W Huang
(74) *Attorney, Agent, or Firm* — Nixon & Vanderhye P.C.

(57) ABSTRACT

A wearable electronic device according to an embodiment may comprise: a housing which includes a front housing, a rear housing opposite to the front member, and a side housing surrounding the inner space between the front housing and the rear housing; a circuit board disposed in the housing and including at least one ground portion; a speaker module comprising a speaker disposed at one side of the rear housing and connected to the circuit board; and a support configured to support the speaker module and comprising a conductive material, wherein the support is electrically connected to the ground portion of the circuit board.

20 Claims, 17 Drawing Sheets

(56) References Cited

U.S. PATENT DOCUMENTS

| | | | |
|---|---|---|---|
| 8,538,345 B2 | 9/2013 | Mohammadian et al. | |
| 8,982,000 B2 | 3/2015 | Kim et al. | |
| 9,660,324 B2 | 5/2017 | Baringer et al. | |
| 10,134,256 B2 | 11/2018 | Park et al. | |
| 10,153,537 B2 | 12/2018 | Baringer et al. | |
| 10,950,932 B1 | 3/2021 | Ruaro et al. | |
| 11,405,998 B2 * | 8/2022 | Lee | H05B 47/105 |
| 2010/0134350 A1 | 6/2010 | Mohammadian | |
| 2013/0093640 A1 | 4/2013 | Kwon et al. | |
| 2014/0112511 A1 * | 4/2014 | Corbin | H05K 9/006 343/702 |
| 2015/0349410 A1 * | 12/2015 | Russell | G04G 21/04 29/601 |
| 2016/0036119 A1 | 2/2016 | Baringer | |
| 2016/0217943 A1 * | 7/2016 | Kim | H01H 13/063 |
| 2016/0234143 A1 | 8/2016 | Choudhary et al. | |
| 2016/0259426 A1 | 9/2016 | Yuen et al. | |
| 2017/0311456 A1 | 10/2017 | Wang et al. | |
| 2018/0063981 A1 * | 3/2018 | Park | H05K 5/10 |
| 2019/0098383 A1 | 3/2019 | Ely et al. | |
| 2020/0203815 A1 | 6/2020 | Baw et al. | |
| 2020/0274956 A1 | 8/2020 | Mittleman et al. | |
| 2020/0329303 A1 | 10/2020 | Sim et al. | |
| 2020/0333421 A1 | 10/2020 | Perkins et al. | |
| 2020/0337162 A1 | 10/2020 | Perkins et al. | |
| 2021/0034119 A1 | 2/2021 | Yoon et al. | |
| 2021/0098869 A1 | 4/2021 | Ruaro et al. | |
| 2021/0392422 A1 * | 12/2021 | Crowley | H04R 1/025 |
| 2022/0224784 A1 | 7/2022 | Mittleman et al. | |

FOREIGN PATENT DOCUMENTS

| | | |
|---|---|---|
| CN | 209803577 | 12/2019 |
| CN | 112022490 | 12/2020 |
| KR | 10-2010-0048273 | 5/2010 |
| KR | 10-2010-0080931 | 7/2010 |
| KR | 10-2011-0006999 | 1/2011 |
| KR | 10-1471466 | 12/2014 |
| KR | 10-2021-0015460 | 2/2021 |
| WO | 2020/214758 | 10/2020 |

OTHER PUBLICATIONS

Action dated Jan. 9, 2026 in European Patent Application No. 22833545.1.

Action dated Jan. 23, 2026 in Korean Patent Application No. 10-2021-0084297 with English translation.

* cited by examiner

WEARABLE ELECTRONIC DEVICE COMPRISING ANTENNA

CROSS-REFERENCE TO RELATED APPLICATIONS

This application is a continuation of International Application No. PCT/KR2022/009143 designating the United States, filed on Jun. 27, 2022, in the Korean Intellectual Property Receiving Office and claiming priority to Korean Patent Application No. 10-2021-0084297, filed on Jun. 28, 2021, in the Korean Intellectual Property Office, the disclosures of each of which are incorporated by reference herein in their entireties.

BACKGROUND

Field

The disclosure relates to a wearable electronic device including an antenna.

Description of Related Art

As portable devices such as smartphones become common, the spread of wearable electronic devices (e.g., smart watches) used in conjunction with smartphones is also rapidly increasing.

A wearable electronic device may include antennas supporting various frequency bands to perform various functions. The electronic device may include, for example, a plurality of antennas for performing wireless communication such as LTE and Wi-Fi and short-range communication such as Bluetooth. The antennas may include at least a portion of a housing as an antenna element. For example, the electronic device may utilize a metal part forming at least a portion of the housing as a radiating element of an antenna.

The wearable electronic device may include a speaker module for outputting sound to the outside. The electronic device may include a support structure (e.g., a SUS plate) for supporting the speaker module to waterproof or seal the speaker module and/or the electronic device.

A wearable electronic device may have a speaker module disposed in its limited internal space and secure a disposition space for disposing the speaker module to maintain performance of the speaker module.

In the wearable electronic device, the size of a circuit board may be reduced as the disposition space for the speaker module is secured and a ground area may be reduced, which may cause deterioration in antenna performance.

Since the wearable electronic device utilizes a housing (e.g., metal) as an antenna, a conductive member disposed in a region adjacent to the antenna may act as an antenna obstruction element, which may cause deterioration in antenna performance.

SUMMARY

Embodiments of the disclosure may provide a wearable electronic device capable of increasing a ground area and improving antenna performance by utilizing a structure supporting a speaker module.

According to an example embodiment of the disclosure, there is provided a wearable electronic device including: a housing including a front housing, a rear housing opposite to the front housing, and a side frame surrounding an inner space between the front housing and the rear housing; a circuit board disposed in the housing and including at least one ground portion; a speaker module comprising a speaker disposed at one side of the rear housing and connected to the circuit board; and a support configured to support the speaker module and comprising a conductive material, wherein the support is electrically connected to the ground portion of the circuit board.

According to an example embodiment of the disclosure, there is provided a wearable electronic device including: a housing including a front housing facing a first direction, a rear housing facing a second direction opposite to the first direction, and a side frame surrounding an inner space between the front housing and the rear housing, the rear housing including a rear case coupled to the side frame and a cover coupled to the rear case, a display disposed inside the housing and visible in the first direction through the front housing, a circuit board disposed inside the housing and including at least one ground plane, a bracket disposed between the display and the rear case and on which the circuit board is seated, a speaker module comprising a speaker coupled to one side of the rear case and positioned in a space between the bracket and the rear case, and a support coupled to the rear case supporting the speaker module and comprising a conductive material, wherein the support contacts at least a portion of the speaker module to bring the speaker module into close contact with an inner side of the rear case and is electrically connected to the ground plane of the circuit board.

In an electronic device according to various example embodiments disclosed herein, a support structure of a speaker module can be electrically connected to a ground portion of a circuit board, thereby increasing a ground area and improving antenna performance.

In addition, in the electronic device according to various example embodiments disclosed herein, the support structure of the speaker module can be physically connected to the circuit board through a connector, thereby providing a path for heat to move between the speaker module and the circuit board and improving the heat dissipation performance.

Besides, various effects may be provided that are directly or indirectly identified through the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With respect to the description of the drawings, the same or similar reference signs may be used for the same or similar elements.

DETAILED DESCRIPTION

Hereinafter, various example embodiments disclosed in the disclosure will be described in greater detail with reference to the accompanying drawings. However, this is not intended to limit the various embodiments disclosed herein to specific embodiments, and it is to be understood to include various modifications, equivalents, and/or alternatives of embodiments of the disclosure.

Figure 1:
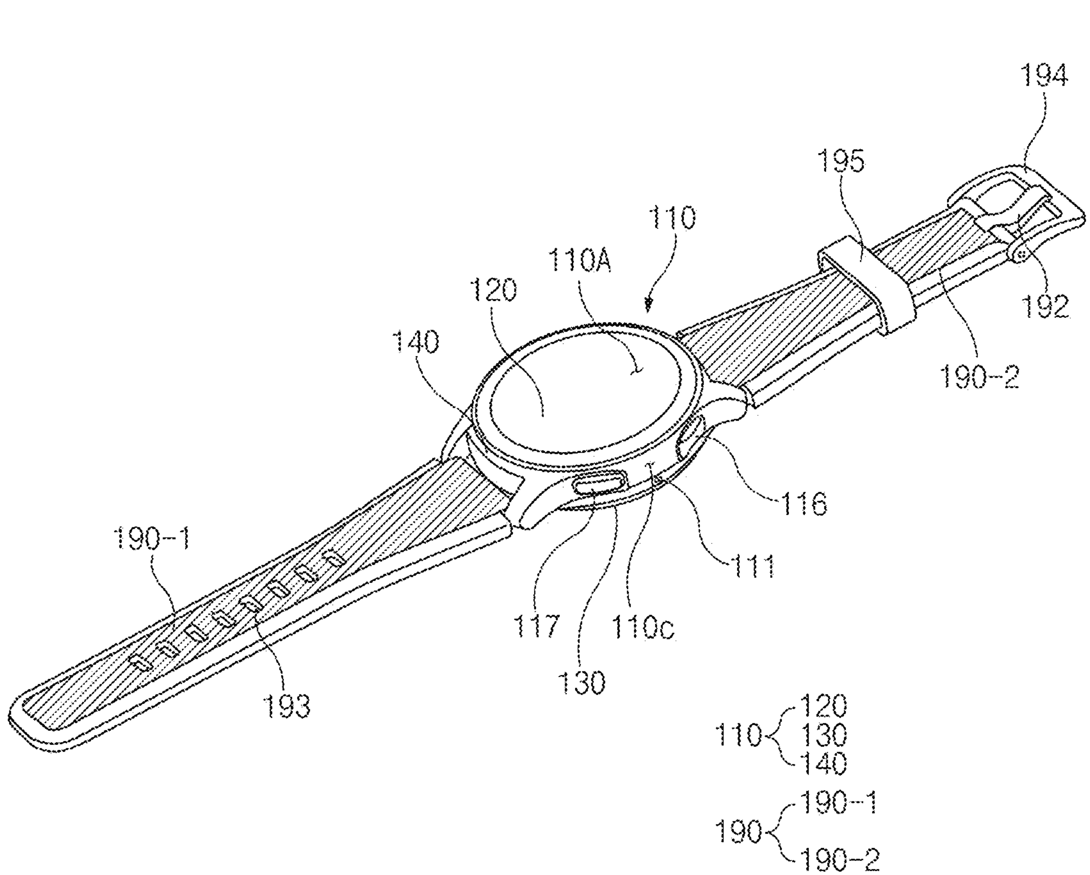
FIG. 1 is a front perspective view of an electronic device according to various embodiments.
Figure 2:
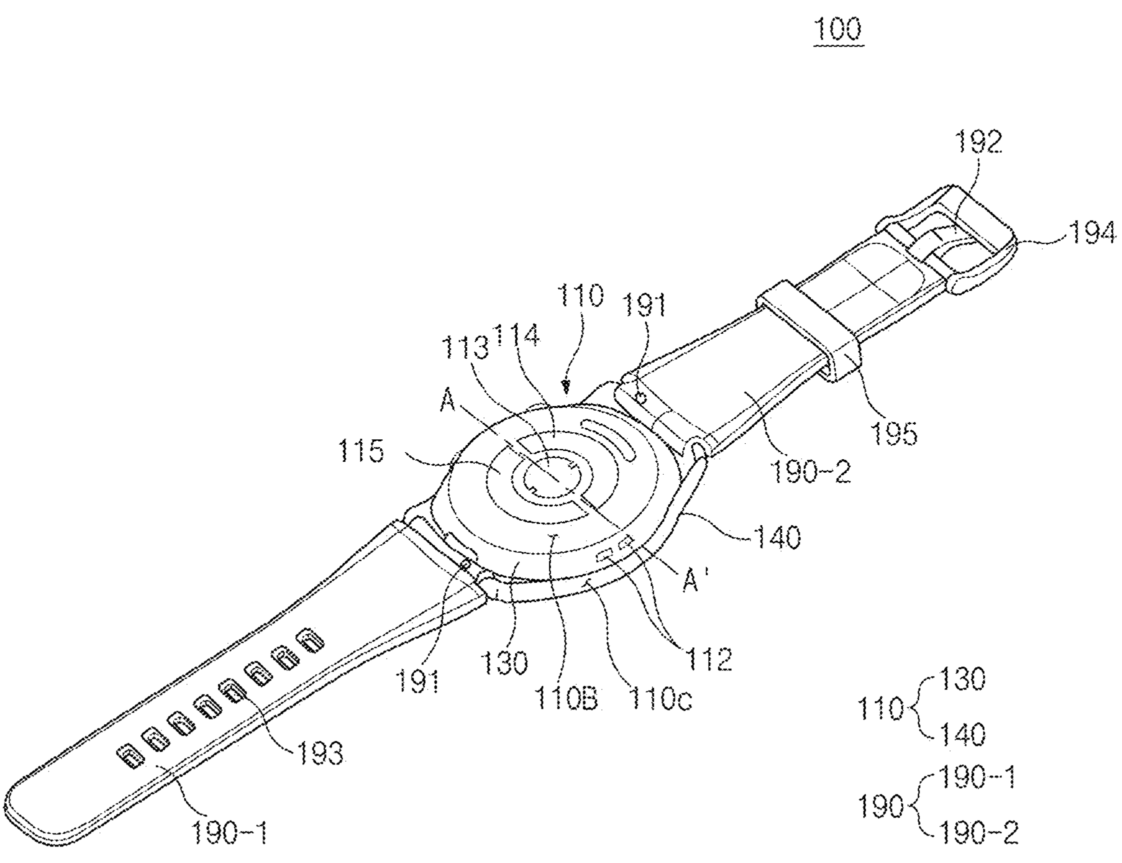
FIG. 2 is a rear perspective view of the electronic device according to various embodiments.

FIG. 1 is a front perspective view of an electronic device according to various embodiments. FIG. 2 is a rear perspective view of the electronic device according to various embodiments.

Referring to FIGS. 1 and 2, an electronic device 100 according to an embodiment may include a housing 110, audio modules 111 and 112, sensor modules 113, 114, and 115, and key input devices 116 and 117, and/or a coupling member 190.

The electronic device 100 according to an embodiment may be a wearable electronic device. For example, the electronic device 100 may be a watch-type electronic device (e.g., a smart watch) capable of being worn on a part of a user's body (e.g., a wrist or an ankle). However, the electronic device according to various embodiments disclosed herein is not limited to the illustrated embodiment.

In an embodiment, the housing 110 may form at least a portion of the exterior of the electronic device 100. The housing 110 may include a front member (e.g., a front housing) 120, a side member 140 (e.g., a side frame), and/or a rear member (e.g., a rear housing) 130. For example, the front member 120, the side member 140, and/or the rear member 130 may be coupled to each other.

In an embodiment, the housing 110 may be formed in a structure in which the side member 140 surrounds a space between the front member 120 and the rear member 130. For example, the housing 110 may provide an inner space allowing other components (e.g., a display 181, a bracket 182, a circuit board 150, and/or a battery 183 of FIGS. 3 and 4) of the electronic device 100 to be accommodated through a coupling structure of the front member 120, the side member 140, and/or the rear member 130.

In an embodiment, the housing 110 may include a front surface 110A, a back surface 110B facing an opposite direction of the front surface 110A, and a side surface 110C surrounding a space between the front surface 110A and the back surface 110B. For example, the front surface 110A may be formed by a portion of the front member 120, the side surface 110C may be formed by a portion of the side member 140, and the back surface 110B may be formed by a portion of the rear member 130. In various embodiments, the housing 110 may be understood to refer to a structure that forms part of the front surface 110A, the back surface 110B, and the side surfaces 110C.

In an embodiment, the audio modules 111 and 112 may include a microphone hole 111 and/or speaker holes 112. The microphone hole 111 and the speaker holes 112 may be respectively formed on at least a portion of the rear member 130. However, positions of the microphone hole 111 and the speaker holes 112 are not limited to the illustrated example, and may be formed on other components (e.g., the side member 140).

For example, a microphone (e.g., a microphone module 185 of FIG. 4) for obtaining external sound may be disposed adjacent to the microphone hole 111 inside the housing 110. According to various embodiments, the electronic device 100 may be configured such that a plurality of microphones are disposed in the housing 110 to detect sounds from various directions.

For example, a speaker (e.g., a speaker module 160 of FIG. 4) for outputting sound to the outside may be disposed adjacent to the speaker hole 112 inside the housing 110. According to various embodiments, the speaker holes 112 and the microphone hole 111 may be implemented as one hole. Alternatively, the electronic device 100 may be configured to include a speaker without the speaker holes 112 (e.g., a piezo speaker).

In an embodiment, the sensor modules 113, 114, and 115 may generate an electrical signal or data value corresponding to an internal operational state or an external environmental state of the electronic device 100.

In an embodiment, the sensor modules 113, 114, and 115 may include a first biometric sensor module 113 exposed to the back surface 110B of the housing 110. The first biometric sensor module 113 may include, for example, a heart rate measurement (HRM) sensor. For example, biometric signals detected through the first biometric sensor module 113 may be biometric signals related to the heart rate. The first biometric sensor module 118 may be disposed inside the housing 110, and at least a portion of the first biometric sensor module 118 may be visible to the back surface 110B of the housing 110 through a partial region of the rear member 130.

In an embodiment, the sensor modules 113, 114, and 115 may include second biometric sensor modules 114 and 115 disposed on the back surface 110B of the housing 110. The second biometric sensor modules 114 and 115 may be, for example, electrocardiogram (ECG) sensors. For example, biometric signals detected through the second biometric sensor modules 114 and 115 may be biometric signals related to an electrocardiogram. For example, the second biometric sensor modules 114 and 115 may include a first electrode region 114 and a second electrode region 115 formed of a conductive material, and the first electrode region 114 and the second electrode region 115 may contact the user's body. The second biometric sensor modules 114 and 115 may be configured to obtain electrical signals from a part of the user's body through the first electrode region 114 and the second electrode region 115 and detect the user's biometric signals based on the obtained electrical signals.

According to various embodiments of the disclosure, the electronic device 100 may further include another sensor module, for example, and without limitation, at least one of a gesture sensor, a gyro sensor, an atmospheric pressure sensor, a magnetic sensor, an acceleration sensor, a grip sensor, a color sensor, an infrared ray (IR) sensor, a biometric sensor, a temperature sensor, a humidity sensor, an illuminance sensor, or the like.

In an embodiment, the key input devices 116 and 117 may include a button member (e.g., a side key) disposed on the side surface 110C of the housing 110.

In an embodiment, the key input devices 116 and 117 may receive user input for implementing various functions of the electronic device 100 by being rotated and/or pressed by the user's manipulation. The key input devices 116 and 117 may include, for example, a first button member 116 and a second button member 117. In various embodiments, at least one of the first button member 116 and the second button member 117 may be formed as an electrode button capable of detecting the user's biometric signal (e.g., the electrocardiogram) as a part of a user's body (e.g., a finger) comes into contact therewith.

Although not illustrated, the key input devices 116 and 117 may further include a wheel key (not illustrated) disposed on the front surface 110A of the housing 110 and rotatable in at least one direction. For example, the wheel key may have a shape corresponding to the shape of the front member 120 (e.g., a circular frame). In various embodiments, the wheel key may receive user input for implementing various functions of the electronic device 100 by being rotated by the user's manipulation.

In various embodiments, the electronic device 100 may not include some or all of the above-described key input devices 116 and 117, and the key input device(s) which is (are) not included may be implemented in other forms, for example, in the form of a soft key, on the display 181.

In an embodiment, the coupling member 190 may allow the electronic device 100 to be detachably worn on a part of the user's body (e.g., wrist or ankle). For example, the coupling member 190 may be connected to at least a portion of the housing 110, and may be configured to be coupled to be detachable in a state of wrapping around a part of the user's body. For example, the coupling member 190 may include a first coupling member 190-1 and a second coupling member 190-2 coupled to both sides of the housing 110, respectively. The first coupling member 190-1 and the second coupling member 190-2 may be connected to or separated from each other.

In an embodiment, the coupling member 190 may be in the form of a band or strap to wrap around a part of the user's body. For example, the coupling member 190 may be formed in an integrated type and such that a plurality of unit links are flowable with each other, by the woven fabric, leather, rubber, urethane, metal, ceramic, or a combination of at least two of the above materials.

In an embodiment, the coupling member 190 may be detachably connected to the housing 110. For example, the coupling member 190 may be detachably connected to at least a partial region of the housing 110 using locking members 191 and 192. According to various embodiments of the disclosure, the electronic device 100 may be provided with various types of coupling members 190, and the coupling member 190 may be replaced according to a user's taste and/or preference.

In an embodiment, the coupling member 190 may include a fixing member 192, a fixing member fastening hole 193, a band guide member 194, and/or a band fixing ring 195. For example, the fixing member 192 may be configured to fix the housing 110 and the coupling member 190 to a user's body part (e.g., wrist, ankle, and so on). The fixing member fastening hole 193 may fix the housing 110 and the coupling member 190 to the user's body part corresponding to the fixing member 192. The band guide member 194 may be configured to limit the range of movement of the fixing member 192 when the fixing member 192 is fastened to the fixing member fastening hole 193, thereby making it possible for the coupling member 190 to be closely coupled to the user's body part. The band fixing ring 195 may limit the range of movement of the coupling member 190 in a state in which the fixing member 192 and the fixing member fastening hole 193 are fastened.

According to various embodiments of the disclosure, the electronic device 100 may omit at least one of the components illustrated in FIGS. 1 and 2 (e.g., key input devices 116 and 117 or sensor modules 113, 114, and 115) or additionally include other components. For example, the electronic device 100 may further include a connector hole (not illustrated). The connector hole (not illustrated) may accommodate a connector (e.g., a USB connector) for transmitting and/or receiving electric power and/or data to and/or from an external electronic device, or accommodate a connector (e.g., an earphone connector) for transmitting and/or receiving audio signals to and/or from an external electronic device.

Figure 3:
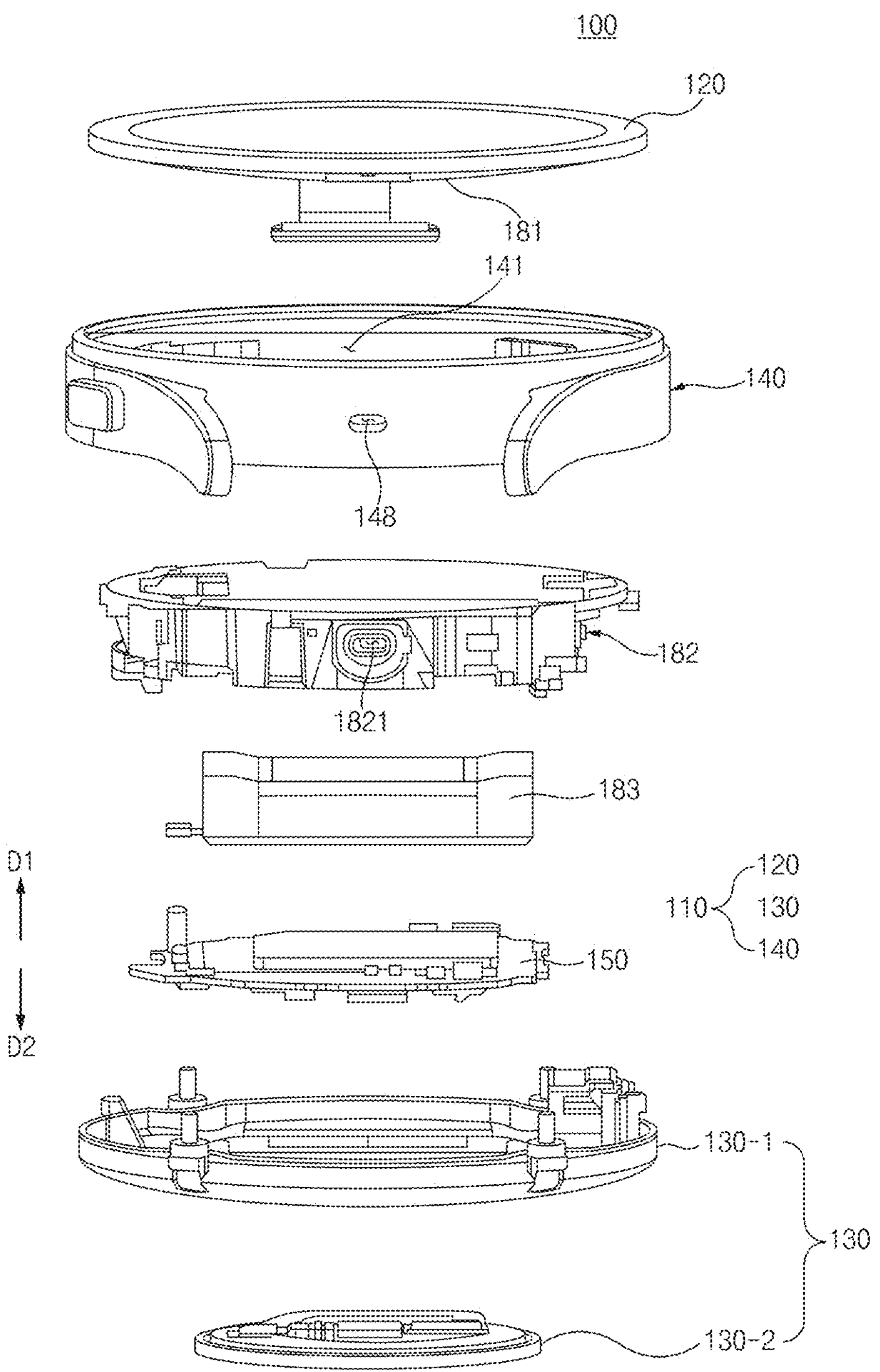
FIG. 3 is an exploded perspective view of the electronic device according to various embodiments.
Figure 4:
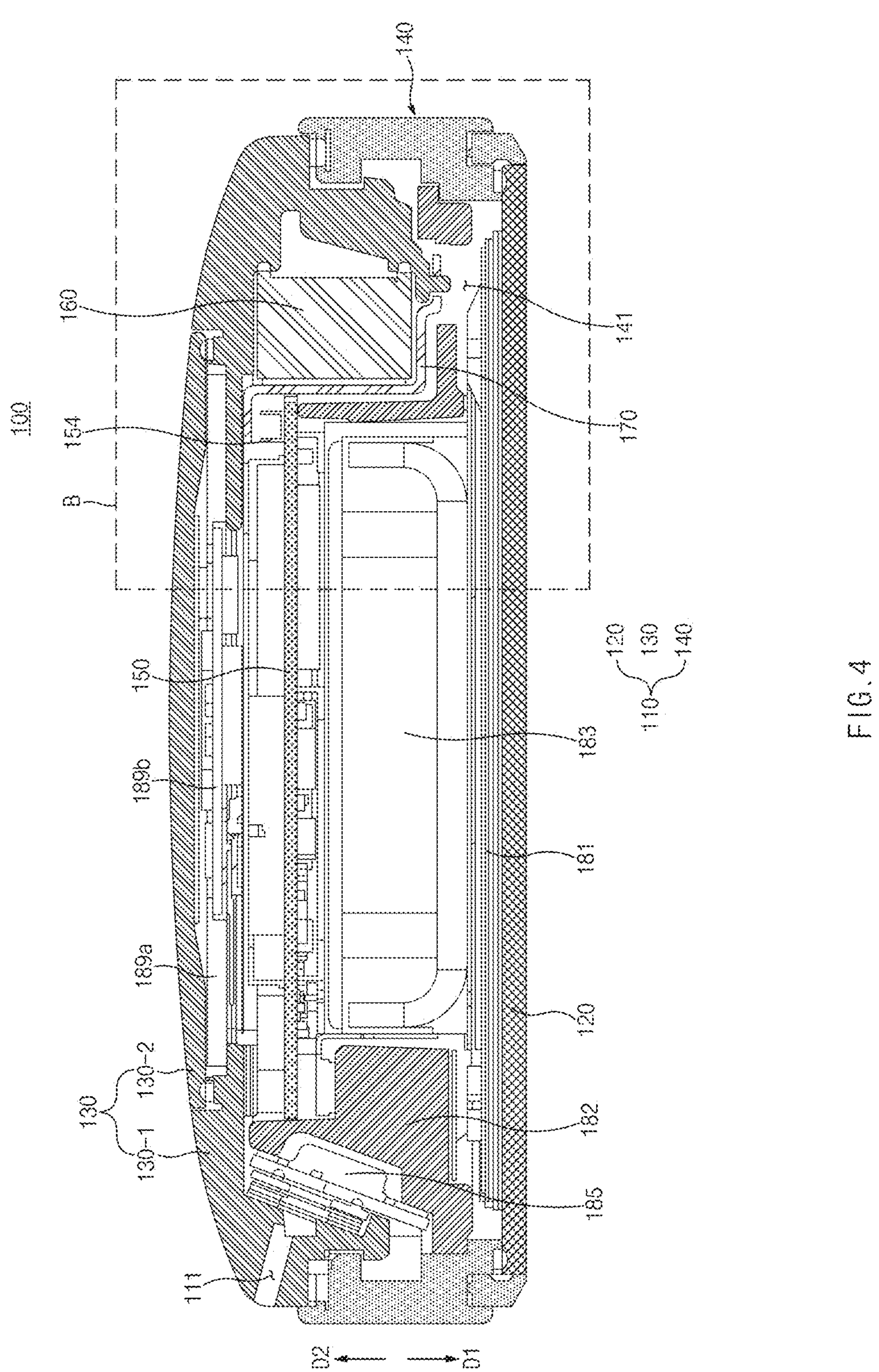
FIG. 4 is a cross-sectional view of the electronic device according to various embodiments.

FIG. 3 is an exploded perspective view of the electronic device according to various embodiments. FIG. 4 is a cross-sectional view of the electronic device according to various embodiments.

FIG. 4 is a cross-sectional view illustrating a cross section taken along line A-A' in the electronic device illustrated in FIG. 2.

Referring to FIGS. 3 and 4, the electronic device 100 according to an embodiment may include the housing 110, the display 181, the bracket 182, the circuit board 150, the speaker module 160, a support member 170, the battery 183, and/or the microphone module 185.

FIGS. 3 and 4 may be views in which a coupling member (e.g., the coupling member 190 of FIGS. 1 and 2) of the electronic device 100 is omitted. Some of the components of the electronic device 100 illustrated in FIGS. 3 and 4 may be the same as or similar to those of the electronic device 100 illustrated in FIGS. 1 and 2, and descriptions thereof may not be repeated below.

In an embodiment, the housing 110 may include the front member 120, the side member 140, and/or the rear member 130. For example, the front member 120 and the rear member 130 are respectively coupled to the upper (e.g., a first direction D1) and lower (e.g., a second direction D2) of the side member 140, and accordingly, an inner space of the housing 110 in which the display 181, the bracket 182, the circuit board 150, and/or the battery 183 are accommodated may be formed.

In an embodiment, the front member 120 may be attached to the display 181. For example, the display 181 may be attached to a rear surface (e.g., a surface facing the second direction D2) of the front member 120. At least a portion of the front member 120 may be formed to be substantially transparent so that the display 181 may be visible in a front direction of the electronic device 100 (e.g., in the first direction D1). For example, the front member 120 may be formed of a glass plate or polymer plate including various coating layers.

In an embodiment, the side member 140 may surround the space between the front member 120 and the rear member 130. In an embodiment, an opening 141 for accommodating the circuit board 150, the display 181, the bracket 182, or the battery 183 may be formed in the side member 140. The front member 120 and the rear member 130 may be coupled to the upper and lower portions of the side member 140 to face each other with the opening 141 interposed therebetween. At least a portion of the side member 140 may include a metal material and/or a polymer material. In an embodiment, at least a portion of the side member 140 may be electrically connected to the circuit board 150 to operate as an antenna radiator.

In an embodiment, a through hole 148 may be formed in a portion of the side member 140. The through hole 148 of the side member 140 may be aligned with a duct 1821 formed in the bracket 182. For example, the through hole 148 may be in fluid communication with the duct 1821. Spaces formed by the through hole 148 and the duct 1821 may be used as a path through which air may flow between the inside and outside of the housing 110. Although not illustrated, according to various embodiments, a sensor module (e.g., a barometric sensor) for detecting an external environment of the electronic device 100 may be disposed adjacent to the duct 1821 in the bracket 182, and air outside the housing 110 may move to the barometric pressure sensor through the through hole 148 and the duct 1821.

In an embodiment, the rear member 130 may include a rear case 130-1 coupled to the side member 140 and/or a cover 130-2 coupled to the rear case 130-1. For example, the rear member 130 may be formed as a coupling structure of the rear case 130-1 and the cover 130-2. An outer surface of the rear case 130-1 and an outer surface of the cover 130-2 may form at least a portion of a back surface of the electronic device 100 (e.g., the back surface 110B of FIG. 2). For example, the cover 130-2 may be attached to at least a portion of the rear case 130-1.

In an embodiment, the speaker module 160 may be coupled to the rear member 130. For example, the speaker module 160 and the support member 170 supporting the speaker module 160 may be coupled to one side of the rear case 130-1.

In an embodiment, the rear member 130 may provide an accommodation space for a wireless charging module 189*a* and/or an optical sensor module 189*b*. For example, the rear member 130 may be configured such that the wireless charging module 189*a* and/or the optical sensor module 189*b* are positioned in a space between the rear case 130-1 and the cover 130-2. In various embodiments, the wireless charging module 189*a* and/or the optical sensor module 189*b* may be disposed adjacent to the cover 130-2. The rear member 130 may be formed by coated or colored glass, ceramic, polymer, metal (e.g., aluminum, stainless steel (STS), or magnesium), or a combination of at least two of the above materials. For example, at least a portion of the cover 130-2 may be formed to be transparent so that light may pass through for the operation of the optical sensor module 189*b*.

In an embodiment, the display 181 may be disposed between the front member 120 and the bracket 182. At least a portion of the display 181 may be visually exposed through the front member 120 in the front direction of the housing 110 (e.g., in the first direction D1). For example, the display 181 may be attached to the rear surface (e.g., the surface facing the second direction D2) of the front member 120.

In an embodiment, the display 181 may be electrically connected to the circuit board 150. For example, the display 181 may be disposed such that one surface (e.g., a surface facing the second direction D2) of the display 181 faces one surface (e.g., a surface facing the first direction D1) of the circuit board 150 with the bracket 182 (or battery 183) therebetween, and a connector (not illustrated) of the display 181 may pass through a portion of the bracket 182 to be connected to the circuit board 150.

In an embodiment, the bracket 182 may be disposed inside the housing 110 and support other components of the electronic device 100 (e.g., the circuit board 150, the battery 183, and/or the microphone module 185). The bracket 182 may be disposed inside the opening 141 of the side member 140 to be surrounded by the side member 140. The bracket 182 may be formed of a metal material and/or a non-metal (e.g., polymer) material.

In an embodiment, the bracket 182 may be disposed between the rear member 130 and the display 181. The bracket 182 may provide a predetermined space (not illustrated) in which the battery 183 may be accommodated. The microphone module 185 may be disposed on one side of the bracket 182. For example, the microphone module 185 may be coupled to one side of the bracket 182 to be positioned adjacent to the microphone hole 111 formed in the rear case 130-1.

In an embodiment, the battery 183 may supply electric power to at least some of the components of the electronic device 100. For example, the battery 183 may include a rechargeable secondary battery. The battery 183 may be disposed inside the housing 110 by being supported by the bracket 182. For example, at least a portion of the battery 183 may be surrounded by the bracket 182. In various embodiments, the battery 185 may be integrally disposed inside the electronic device 100, or may be disposed to be detachable from the electronic device 100.

In an embodiment, the circuit board 150 may be supported by the bracket 182. For example, the circuit board 150 may be disposed between the rear member 130 and the bracket 182. The circuit board 150 may be disposed to face the rear member 130, and may be disposed to face the display 181 with the bracket 182 interposed therebetween. For example, the circuit board 150 may be configured such that one surface (e.g., the surface facing the first direction D1) thereof is seated on the bracket 182, and the other surface (e.g., the surface facing the second direction D2) faces the rear member 130 at a distance from each other. The circuit board 150 may include, for example, a printed circuit board (PCB).

In an embodiment, on the circuit board 150, a processor (e.g., a processor 220 of FIG. 16), electronic components such as a memory (e.g., a memory 230 of FIG. 16), a communication module (e.g., a communication module 290 of FIG. 16), various sensor modules (e.g., a sensor module 276 of FIG. 16), an interface (e.g., an interface 277 of FIG. 16), or connection terminals (e.g., a connection terminal 278 of FIG. 16) may be positioned. The processor may include various processing circuitry. For example, as used herein, including the claims, the term "processor" may include various processing circuitry, including at least one processor, wherein one or more of at least one processor may be configured to perform various functions described herein. Additionally, the at least one processor may include a combination of processors performing various of the recited/disclosed functions. At least one processor may execute program instructions to achieve or perform various functions. The processor may include, for example, and without limitation, one or more of a central processing unit, an application processor, a graphic processing unit (GPU), a sensor processor, or a communication processor. The memory may include, for example, a volatile memory or a non-volatile memory. The interface may include, for example, a high-definition multimedia interface (HDMI), a universal serial bus (USB) interface, a secure digital (SD) card interface, or an audio interface. The interface may electrically or physically connect the electronic device 200 to an external electronic device, and may include a USB connector, an SD connector, an MMC connector, or an audio connector.

In an embodiment, the speaker module 160 may be coupled to the rear case 130-1 of the rear member 130. For example, the speaker module 160 may be coupled to a portion of the rear case 130-1 to be positioned adjacent to a speaker hole (e.g., the speaker holes 112 of FIG. 2) formed in the rear case 130-1. The speaker module 160 may output sound to the outside of the housing 110 through the speaker holes 112.

In an embodiment, the support member 170 may be coupled to the rear case 130-1 of the rear member 130 to support the speaker module 160. For example, the support member 170 may be coupled to each of the speaker module 160 and the rear case 130-1, and may support one side of the speaker module 160 so that the speaker module 160 is brought into close contact with an inner wall of the rear case 130-1. For another example, the support member 170 may be coupled to the bracket 182 and disposed to support one side of the speaker module 160. The support member 170 may be formed of a conductive material, and may be electrically connected to at least a portion (e.g., a ground area or a ground plane) of the circuit board 150. For example, the support member 170 may be formed of a metal material.

Although not illustrated, the electronic device 100 may further include an antenna (not illustrated) (e.g., the antenna module 297 of FIG. 13) provided in the form of a flat plate or a thin film. The antenna may perform communication with an external device, wirelessly transmit and receive electric power required for charging, and transmit a short-range communication signal or a self-based signal including payment data. For example, the antenna may include a near field communication (NFC) antenna, a wireless charging antenna, or a magnetic secure transmission (MST) antenna. However, the above-described antenna is an example, and the disclosure is not limited thereto. In various embodiments, the electronic device 100 may be configured such that at least a portion of the housing 110 functions as an antenna. For example, an antenna structure may be formed by a portion of the side member 140 and/or the bracket 182 or a combination thereof.

Figure 5:
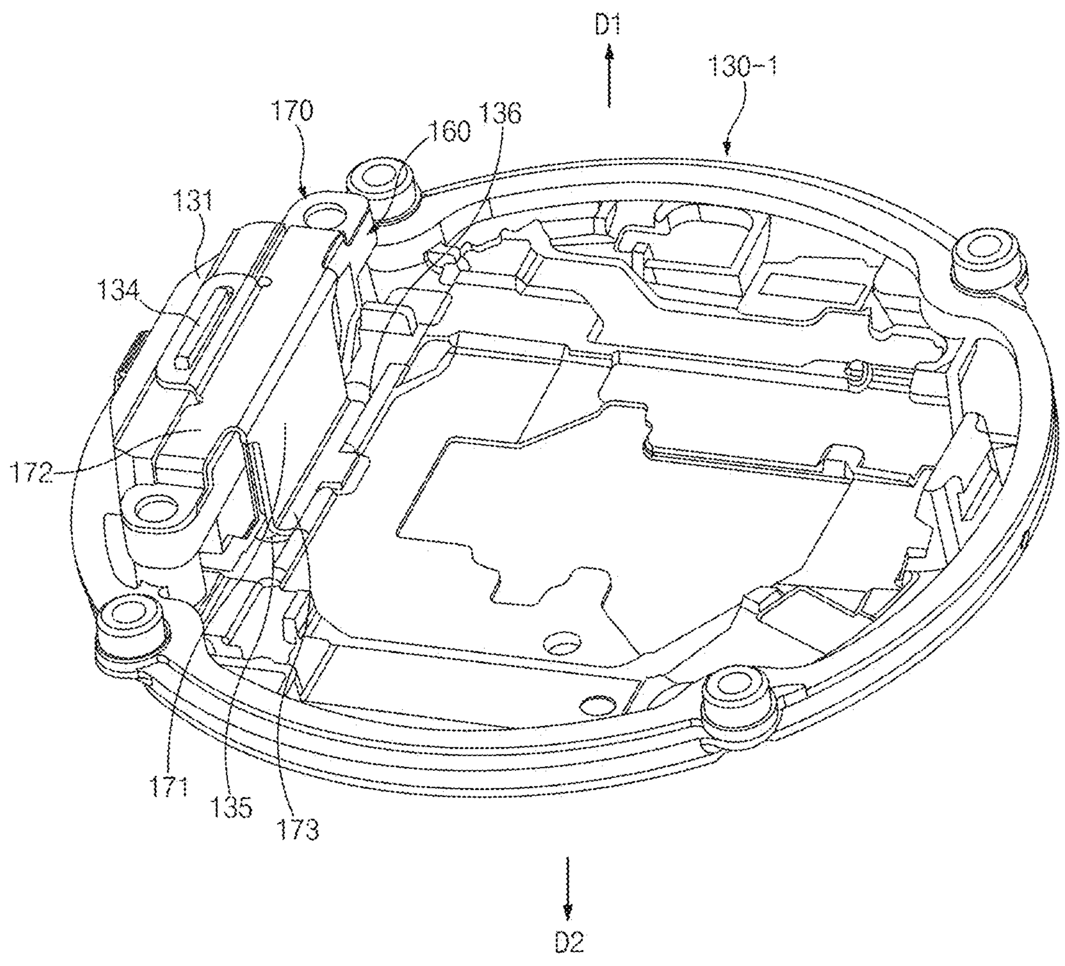
FIG. 5 is a perspective view illustrating a coupling structure of a rear case, a speaker module, and a support member of an electronic device according to various embodiments.
Figure 6:
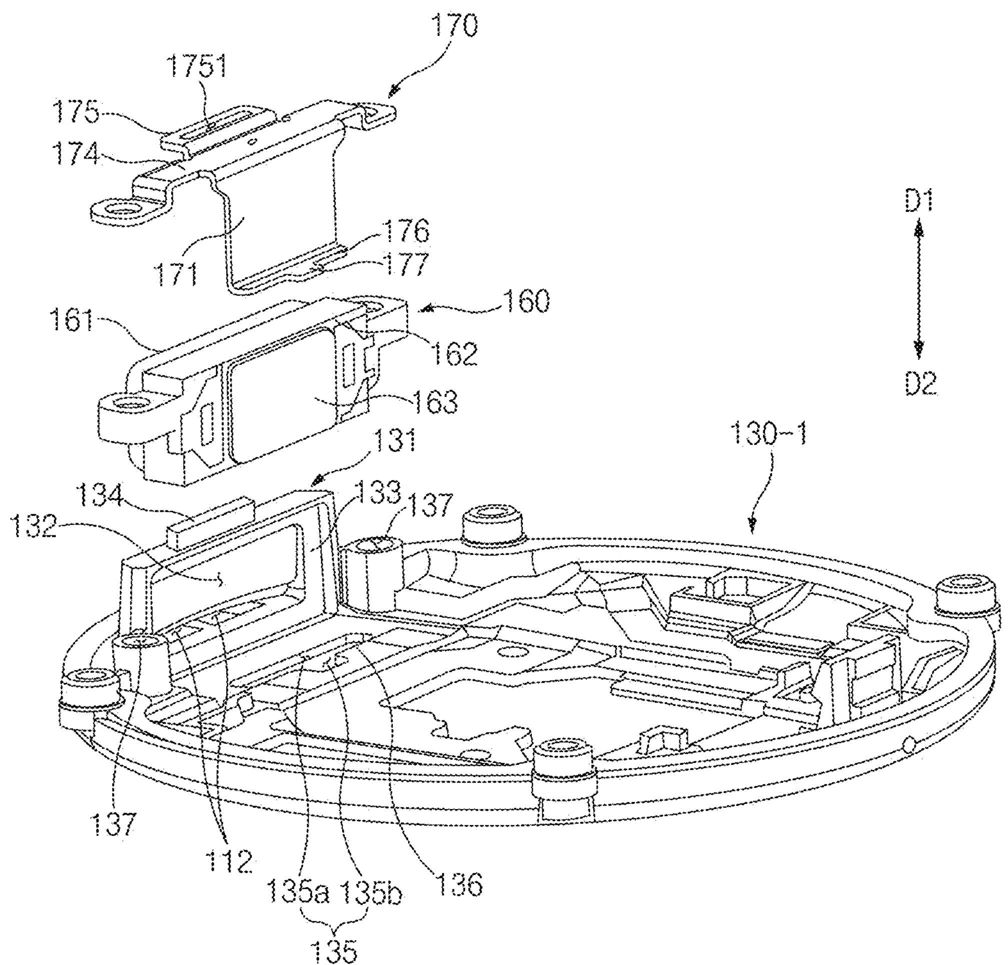
FIG. 6 is a partial exploded perspective view illustrating a state in which the rear case, the speaker module, and the support member of the electronic device are disassembled according to various embodiments.
Figure 7:
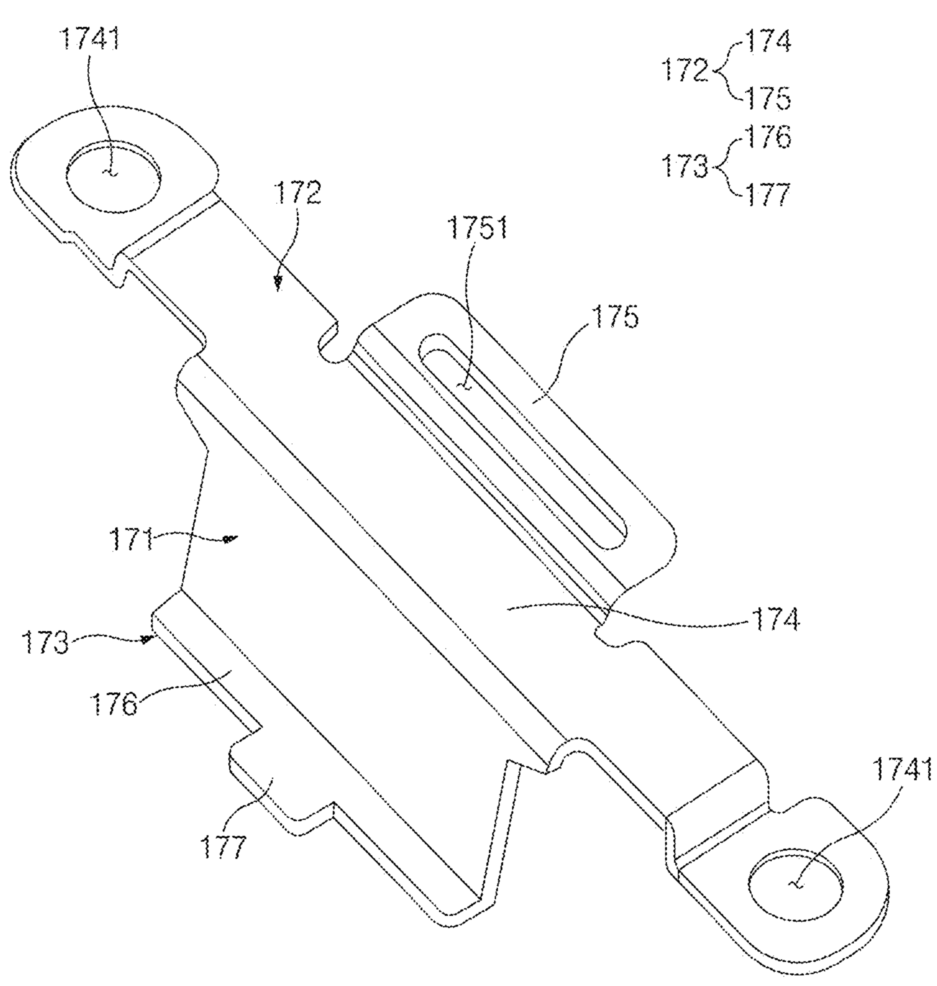
FIG. 7 is a perspective view illustrating the support member of the electronic device according to various embodiments.

FIG. 5 is a perspective view illustrating a coupling structure of a rear case, a speaker module, and a support member of an electronic device according to various embodiments. FIG. 6 is a partial exploded perspective view illustrating a state in which the rear case, the speaker module, and the support member of the electronic device are disassembled according to various embodiments. FIG. 7 is a perspective view illustrating the support member of the electronic device according to various embodiments.

Referring to FIGS. 5, 6, and 7, an electronic device 100 according to an embodiment may include a rear case 130-1, a speaker module 160, and/or a support member 170. In an example, the speaker module 160 and the support member 170 may be coupled to the rear case 130-1.

In an embodiment, the rear case 130-1 may include a coupling portion 131 to which the speaker module 160 and the support member 170 are coupled. For example, the coupling portion 131 may be formed on a portion of a rim of the rear case 130-1. The coupling portion 131 may extend from a rim on one side of the rear case 130-1 in a first direction D1.

In an embodiment, an accommodation space 132 for accommodating at least a portion of the speaker module 160 may be formed in the coupling portion 131. For example, as the speaker module 160 and the support member 170 are coupled to the coupling portion 131, a portion of the speaker module 160 may be accommodated inside the accommodation space 132 and may contact an inner edge portion 133 of the accommodation space 132. The accommodation space 132 may communicate with speaker holes 112 (e.g., the speaker holes 112 of FIG. 2) formed in the rear case 130-1.

In an embodiment, a coupling hole 137 through which at least portions of the speaker module 160 and the support member 170 are screw-coupled may be formed in the coupling portion 131. For example, the speaker module 160 and the support member 170 may be coupled to the coupling portion 131 through a screw member (not illustrated). However, the above-described coupling method is an example, and the disclosure is not limited thereto.

In an embodiment, the rear case 130-1 may include hooking structures 134 and 135 to which at least a portion of the support member 170 is hook-coupled. The hooking structures 134 and 135 may include a hooking protrusion 134 formed on the coupling portion 131 and a hooking groove 135 formed in one surface of the rear case 130-1. For example, the hooking protrusion 134 may protrude from the top of the coupling portion 131 in the first direction D1. The hooking groove 135 may be formed by recessing at least a portion of one surface of the rear case 130-1. For example, the surface of the rear case 130-1 in which the hooking groove 135 is formed may refer, for example, to a surface facing the first direction D1.

In an embodiment, at least a portion of the speaker module 160 may be positioned in the accommodation space 132 of the coupling portion 131. For example, the speaker module 160 may be coupled to the coupling portion 131, and one side thereof may be supported by the support member 170. For example, the speaker module 160 may closely contact the edge portion 133 of the accommodation space 132 by the support member 170. The speaker module 160 may output sound toward the speaker holes 112 (e.g., the speaker holes 112 of FIG. 2) connected to the accommodation space 132. According to the illustrated embodiment, the speaker module 160 may be coupled to the rear case 130-1 and output sound through speaker holes 112 formed on one side of the rear case 130-1. However, the speaker module is not limited to the illustrated embodiment, and according to various embodiments, the speaker holes (not illustrated) may be formed in a side member (e.g., the side member 140 of FIGS. 1 to 4), and the speaker module 160 may be coupled to the coupling portion 131 of the rear case 130-1 and configured to output sound to the outside of the electronic device 100 through the speaker holes formed in the side member 140.

In an embodiment, at least a portion of the speaker module 160 may be electrically connected to the support member 170 through a conductive member 163. For example, the speaker module 160 may include a first side surface 161 of the coupling portion 131 facing the accommodation space 132 and a second side surface 162 facing a direction opposite to the first side surface 161. For example, the first side surface 161 may be a surface that a component (e.g., a diaphragm) for outputting sound faces. The conductive member 163 may be disposed on the second side surface 162. For example, at least a portion of the second side surface 162 of the speaker module 160 may be formed of a metal material, and the conductive member 163 may be disposed between the second side surface 162 and the support member 170 to electrically connect them.

In an embodiment, the support member 170 may support the speaker module 160 so that the speaker module 160 is stably fixed to the rear case 130-1. For example, the support member 170 may be coupled to the rear case 130-1 to surround at least a portion of the speaker module 160. In an embodiment, the support member 170 may be screw-coupled into the coupling hole 137 of the coupling portion 131 together with the speaker module 160. At least a portion of the support member 170 may be hook-coupled to the hooking protrusion 134 and the hooking groove 135 of the coupling portion 131.

In an embodiment, the support member 170 may include a base portion 171 for supporting the second side surface 162 of the speaker module 160, a first extension portion 172 extending from an upper end of the base portion 171 (e.g., an end in the first direction D1), and a second extension portion 173 extending from a lower end (e.g., an end portion in the second direction D2) of the base portion 171. For example, the first extension portion 172 may extend substantially vertically from the upper end of the base portion 171. The second extension portion 173 may extend substantially vertically from the lower end of the base portion 171, and may extend in a direction opposite to the direction in which the first extension portion 172 extends.

Referring to FIGS. 5 and 6, the first extension portion 172 may extend from the base portion 171 toward the outside of the rear case 130-1 or in a direction in which the first side surface 161 of the speaker module 160 faces, and the second extension portion 173 may extend from the base portion 171 toward the inside of the rear case 130-1 or in a direction in which the second side surface 162 of the speaker module 160 faces.

In an embodiment, the base portion 171 may be disposed to face the second side surface 162 of the speaker module 160. For example, the base portion 171 may support the speaker module 160 in the direction of the second side surface 162 by contacting the conductive member 163 disposed on the second side surface 162. In various embodiments, the conductive member 163 may be omitted from the second side surface 162, and in this case, the base portion 171 may contact the second side surface 162.

In an embodiment, the first extension portion 172 may include a fixing portion 174 screw-coupled to the coupling hole 137 of the coupling portion 131 together with the speaker module 160 and a first hooking portion 175 hooking or locking with the hooking protrusion 134 of the coupling portion 131.

In an embodiment, the fixing portion 174 may cover at least a portion of an upper surface (e.g., a surface facing the first direction D1) of the speaker module 160, and may have through holes 1741 corresponding to coupling holes 137 on both sides. For example, the fixing portion 174 may be coupled to the coupling portion 131 together with the speaker module 160 by screw members (not illustrated) being fastened to the coupling holes 137 through the through holes 1741 and a portion of the speaker module 160.

In an embodiment, the first hooking portion 175 may extend from the fixing portion 174 to be positioned between the through holes 1741. A hooking hole 1751 into which the hooking protrusion 134 is inserted may be formed in the first hooking portion 175. For example, the hooking hole 1751 may be formed in a position and/or shape corresponding to the hooking protrusion 134 formed on the coupling portion 131. At least a portion of the hooking protrusion 134 is inserted into the hooking hole 1751 and hooked, and thereby the support member 170 may not be pushed in the direction of the second side surface 162 of the speaker module 160 and thus stably support the speaker module 160.

In an embodiment, the second extension portion 173 may include a second hooking portion 176 that is hooked or locked to the hooking groove 135 of the coupling portion 131 and a contact portion 177 extending from the second hooking portion 176.

In an embodiment, at least a portion of the second extension portion 173 may be accommodated inside the hooking groove 135. For example, the hooking groove 135 may include a first groove region **135*a* corresponding to the second hooking portion 176 and a second groove region 135*b* corresponding to the contact portion 177. The second groove region 135*b* may extend from a portion of the first groove region 135*a*. For example, the second groove region 135*b* may be formed between steps 136 of the first groove region 135*a***.

In an embodiment, the second hooking portion 176 may be accommodated in the first groove region **135*a* of the hooking groove 135, and an edge portion thereof may contact the steps 136 of the hooking groove 135. The second hooking portion 176 is hooked to the steps 136 of the hooking groove 135, and thereby the support member 170 may not be pushed in the direction of the second side surface 162 of the speaker module 160 and thus stably support the speaker module 160**.

In an embodiment, the contact portion 177 may extend substantially parallel to the second hooking portion 176 from at least a portion of the second hooking portion 176. The contact portion 177 may be accommodated in the second groove region **135*b* of the hooking groove 135. For example, the contact portion 177 may be positioned in the second groove region 135*b* and electrically connected to the circuit board 150. In the embodiments disclosed herein, the contact portion 177 may contact a contact member (e.g., a C-clip or SMD conductive gasket) disposed on the circuit board 150 so that the support member 170 may be electrically connected to the circuit board 150. An electrical connection structure between the support member 170 and the circuit board 150 by the contact portion 177 will be described in greater detail below with reference to FIGS. 8, 9 and 10**.

Figure 8:
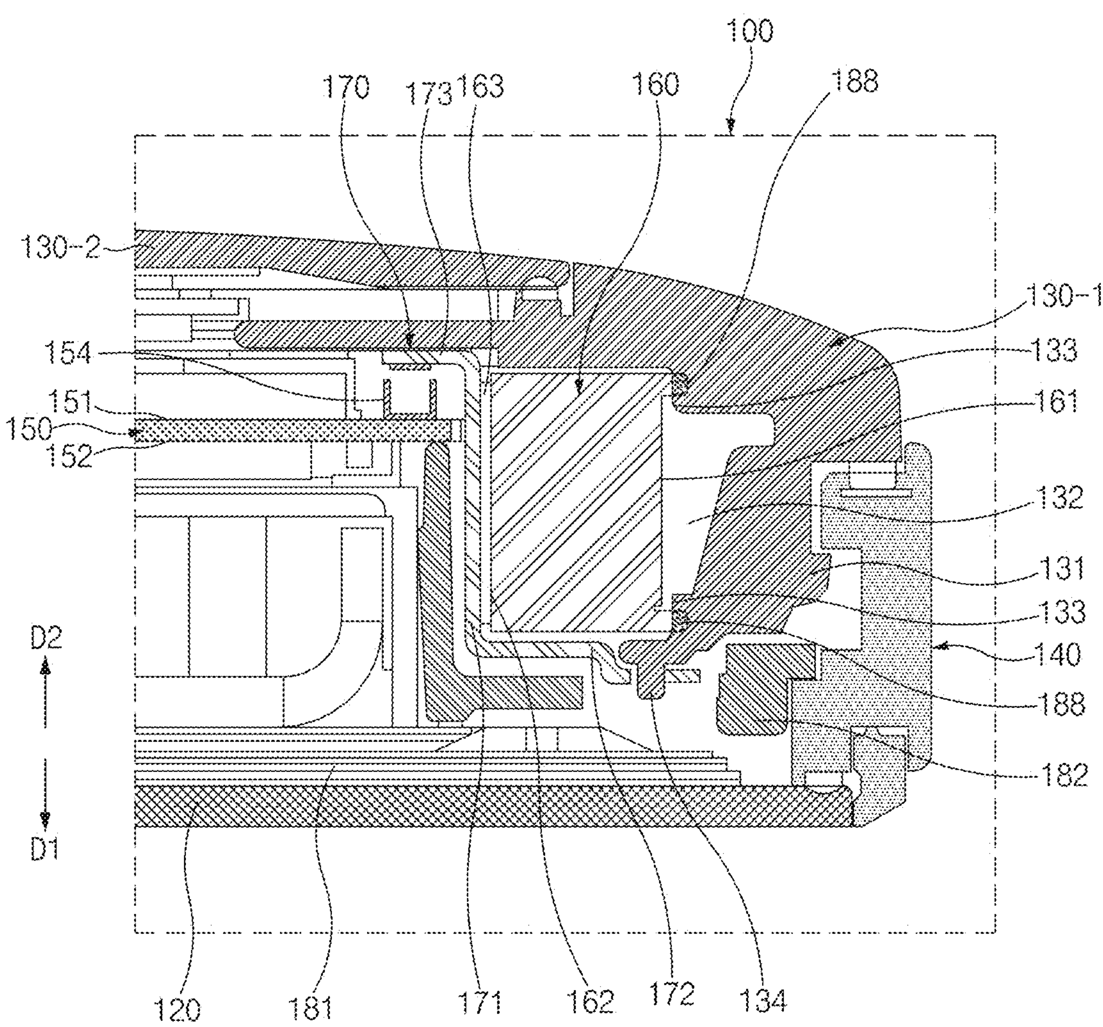
FIG. 8 is a partial cross-sectional view of a portion of the electronic device according to various embodiments.
Figure 9:
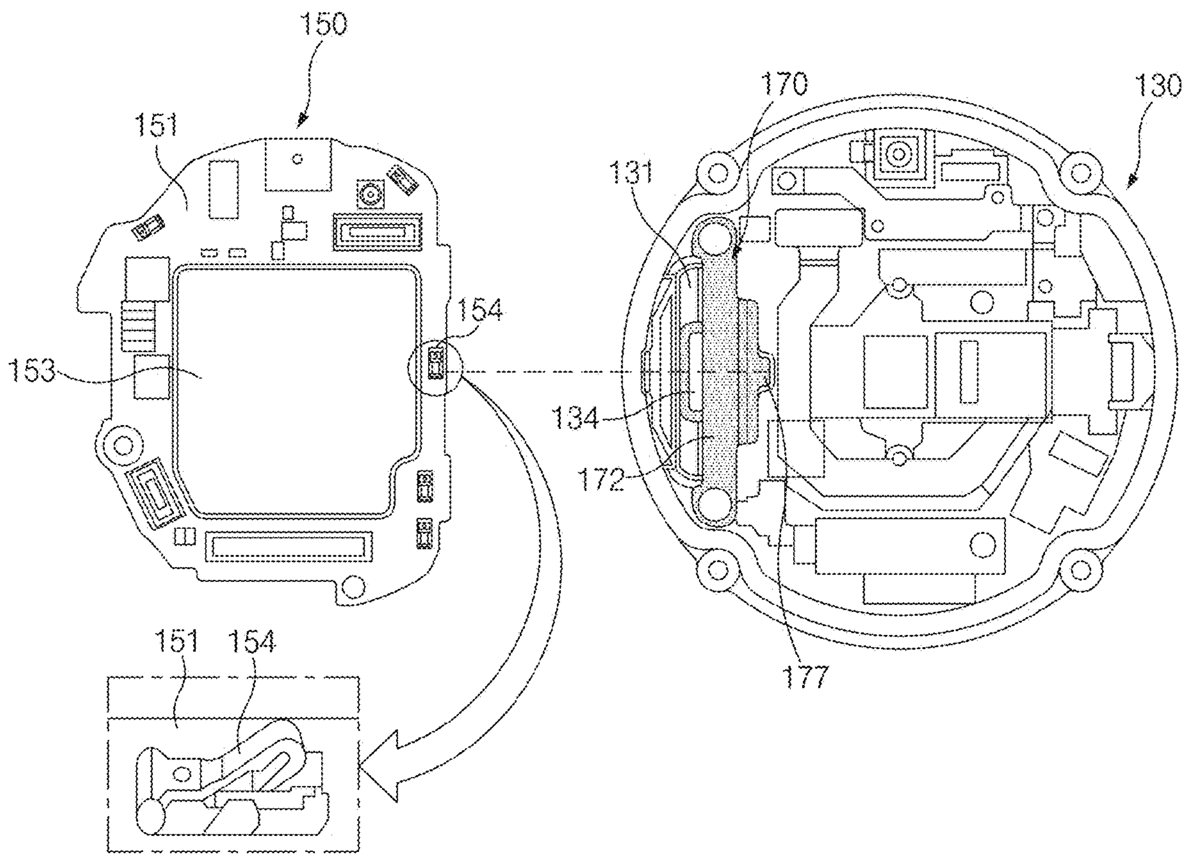
FIG. 9 is a diagram illustrating an electrical connection structure between a circuit board and the support member of the electronic device according to various embodiments.
Figure 10:
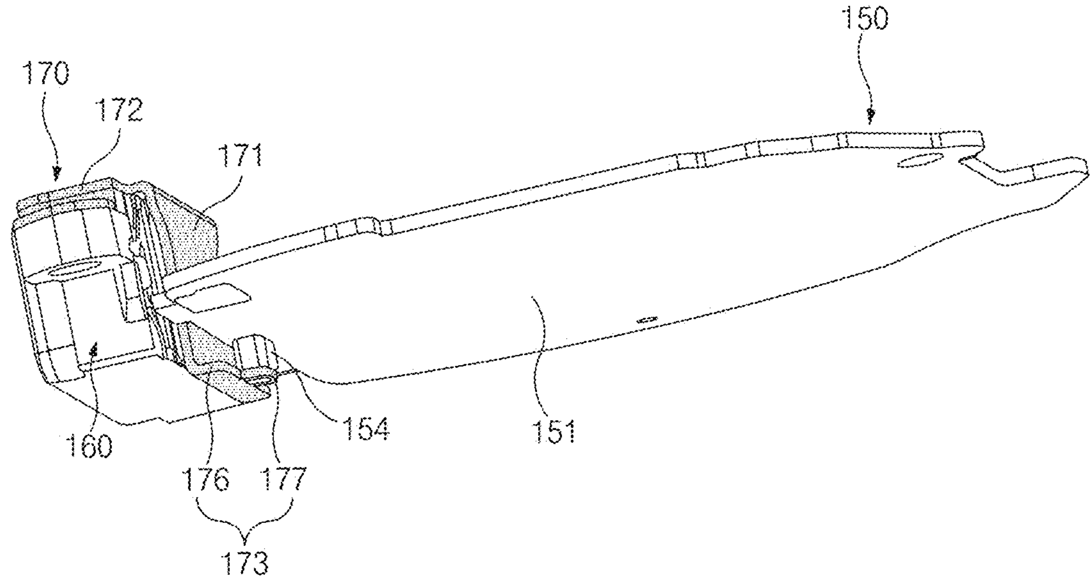
FIG. 10 is a perspective view illustrating an electrical connection structure between the circuit board and the support member of the electronic device according to various embodiments.

FIG. 8 is a partial cross-sectional view of a portion of the electronic device according to various embodiments. FIG. 9 is a diagram illustrating an electrical connection structure between the circuit board and the support member of the electronic device according to various embodiments. FIG. 10 is a perspective view illustrating an electrical connection structure between the circuit board and the support member of the electronic device according to various embodiments.

FIG. 8 is an enlarged view of part B in the cross-sectional view of the electronic device illustrated in FIG. 4.

Referring to FIGS. 8, 9 and 10 (which may be referred to as FIGS. 8 to 10), the electronic device 100 according to an embodiment may include the housing 110, the display 181, the circuit board 150, the bracket 182, the speaker module 160, and/or the support member 170. The housing 110 may include the front member 120, the side member 140, and/or the rear member 130. The rear member 130 may include the rear case 130-1 and/or the cover 130-2.

Some of the components of the electronic device 100 illustrated in FIGS. 8 to 10 may be the same as or similar to those of the electronic devices 100 illustrated in FIGS. 1 to 7, and descriptions thereof may not be repeated below.

According to an embodiment, the electronic device 100 may be configured to utilize at least a portion of the side member 140 of the housing 110 as an antenna. The electronic device 100 may increase the ground area of the antenna as the support member 170 supporting the speaker module 160 is electrically connected to at least a portion (e.g., the ground area) of the circuit board 150. An electrical connection structure between the side member 140 and the circuit board 150 will be described with reference to FIGS. 13 and 14, and hereinafter, the electrical connection structure between the support member 170 and the circuit board 150 will be described in greater detail.

In an embodiment, the circuit board 150 may include a first surface 151 facing the rear member 130 and a second surface 152 facing a direction opposite to the first surface 151. For example, the first surface 151 of the circuit board 150 may be a surface facing the second direction D2, and the second surface 152 may be a surface facing the first direction D1.

In an embodiment, the circuit board 150 may be positioned between the rear member 130 and the bracket 182, and may be seated on the bracket 182. For example, the circuit board 150 may be disposed in the second direction D2 based on the bracket 182. The second side surface 152 of the circuit board 150 may face the bracket 182.

Figure 16:
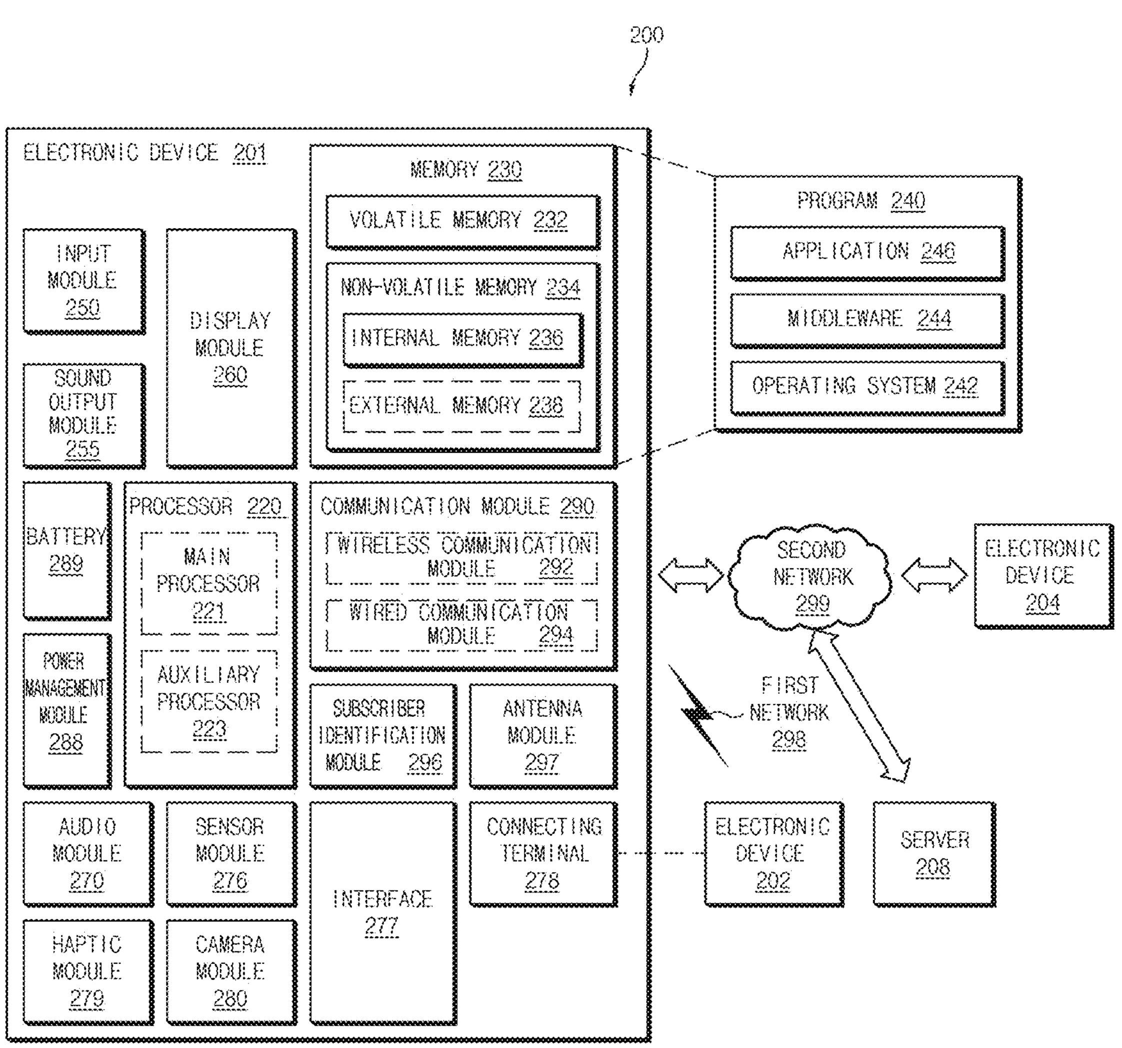
FIG. 16 is a block diagram illustrating an example electronic device in a network environment according to various embodiments.

In an embodiment, various electronic components (e.g., a processor 220 and/or a wireless communication module 292 of FIG. 16) may be disposed on the first surface 151 and/or the second surface 152 of the circuit board 150. In an embodiment, a protection member 153 for protecting electronic components disposed on the circuit board 150 may be disposed on the first surface 151 and/or the second surface 152 of the circuit board 150. For example, the protection member 153 may include an insulating member (e.g., resin) covering the electronic components to protect the electronic components from external moisture or the like, a conductive layer (e.g., conformal shielding) formed on a surface of the insulating member to shield electromagnetic interference (EMI), and/or a shield can for covering electronic components. However, the disclosure is not limited thereto.

In an embodiment, the support member 170 may be coupled to the rear case 130-1 to support the speaker module 160. The support member 170 may bring the speaker module 160 into close contact with the coupling portion 131 of the rear case 130-1 to prevent and/or reduce moisture or foreign matter from entering the housing 110 from the outside of the housing 110 through speaker holes (e.g., the speaker holes 112 of FIGS. 2 and 6) and the accommodation space 132. For example, the speaker module 160 may compress a sealing member 188 disposed between the speaker module 160 and the rear case 130-1 by the support member 170. The support member 170 may be formed of a conductive material. For example, the support member 170 may be formed of a stainless use steel (SUS) material, but the disclosure is not limited thereto.

In an embodiment, the support member 170 may include the base portion 171, the first extension portion 172 extending substantially vertically from the base portion 171 toward the outside of the housing 110, and the second extension portion 173 extending substantially vertically from the base portion 171 toward the inside of the housing 110. For example, the base portion 171 may support the second side surface 162 of the speaker module 160. The first extension portion 172 may be hooked to the hooking protrusion 134 of the coupling portion 131. The second extension portion 173 may partially face the circuit board 150.

In an embodiment, the base portion 171 is coupled to the coupling portion 131 in a state of being in contact with the second side surface 162 (or the conductive member 163) of the speaker module 160, and thereby the support member 170 may bring the speaker module 160 into close contact with the coupling portion 131. At least a portion of the first side surface 161 of the speaker module 160 may come into close contact with the inner edge portion 133 of the accommodation space 132. For example, the sealing member 188 may be disposed between the speaker module 160 and the edge portion 133. The sealing member 188 may include an O-ring or a gasket, and may be formed of soft rubber, silicone, or polymer, but the disclosure is not limited thereto. Although not illustrated, in various embodiments, a blocking member (e.g., a waterproof membrane) may be disposed between the speaker module 160 and the edge portion 133 of the accommodation space 132.

In an embodiment, the second extension portion 173 may be disposed to at least partially face the first surface 151 of the circuit board 150. At least a portion of the second extension portion 173 may contact the first connector 154 disposed on the first surface 151 of the circuit board 150. For example, the support member 170 may be electrically connected to the circuit board 150 with the second extension portion 173 contacting the first connector 154.

In an embodiment, the contact portion 177 of the second extension portion 173 may contact the first connector 154. For example, the first connector 154 may be disposed at a position aligned with the contact portion 177 in the first and second directions D1 and D2 on the first surface 151 of the circuit board 150. The first connector 154 may be electrically connected to a ground area (or ground plane) of the circuit board 150. The contact portion 177 may be electrically connected to the ground area of the circuit board 150 through the first connector 154. For example, the first connector 154 may include a C-clip or an SMD conductive gasket, but the disclosure is not limited thereto, and the first connector 154 may be implemented using various electrically connectable parts. The ground area or ground plane of the circuit board 150 may include a conductive layer positioned on at least one layer of the circuit board 150. The ground area may be formed as one or a plurality of regions in one or a plurality of layers of the printed circuit board. According to various embodiments, the ground area may be referred to as at least one ground portion.

According to an embodiment, the support member 170 is electrically connected to the ground area (or ground plane) of the circuit board 150 through the first connector 154, and thus may function as a ground area of the antenna. Accordingly, the electronic device 100 may increase the ground area of the antenna and stably transmit and/or receive signals in a target frequency band, thereby improving antenna performance.

According to an embodiment, the support member 170 of the electronic device 100 is connected to the circuit board 150 through the first connector 154, and thereby heat dissipation performance may be improved. For example, as the support member 170 contacts the first connector 154, a path through which heat is able to move may be formed through the circuit board 150, the first connector 154, the support member 170, and the speaker module 160. Heat generated from the circuit board 150 may be diffused by moving to the first connector 154, the support member 170, and/or the speaker module 160, and heat generated from the speaker module 160 may be diffused by moving to the support member 170, the first connector 154, and/or the circuit board 150.

In an embodiment, the support member 170 may be electrically connected to at least a portion of the speaker module 160. The support member 170 may be electrically connected to the speaker module 160 through the conductive member 163. A portion of the speaker module 160 may be formed of a conductive material (e.g., metal), and the remaining portion thereof may be formed of a non-conductive material (e.g., an injection molding product).

In an embodiment, the support member 170 may be electrically connected to the portion of the speaker module 160 formed of a conductive material through the conductive member 163. The conductive member 163 may be disposed between the second side surface 162 of the speaker module 160 and the base portion 171 of the support member 170. In an embodiment, portions of the speaker module 160 overlapping the first extension portion 172 of the support member 170 may be portions formed of a non-conductive material. At least a portion of the second side surface 162 of the speaker module 160 may be formed of a conductive material, and may be electrically connected to the support member 170 through the conductive member 163. For example, portions of the speaker module 160 formed of metal may be electrically connected to the support member 170 through the conductive member 163.

In an embodiment, the conductive member 163 may be attached to at least one of the second side surface 162 and the base portion 171 and contact the other in the attached state. For example, the conductive member 163 may be an adhesive tape formed of a conductive material, and may have at least one surface having adhesive strength.

According to an embodiment, as a portion of the speaker module 160 (e.g., the portion formed of a conductive material) is electrically connected to the support member 170 through the conductive member 163 and the support member 170 is electrically connected to the ground area (or ground plane) of the circuit board 150 through the first connector 154, the electronic device 100 may additionally secure the ground area of the antenna using the speaker module 160.

Figure 11:
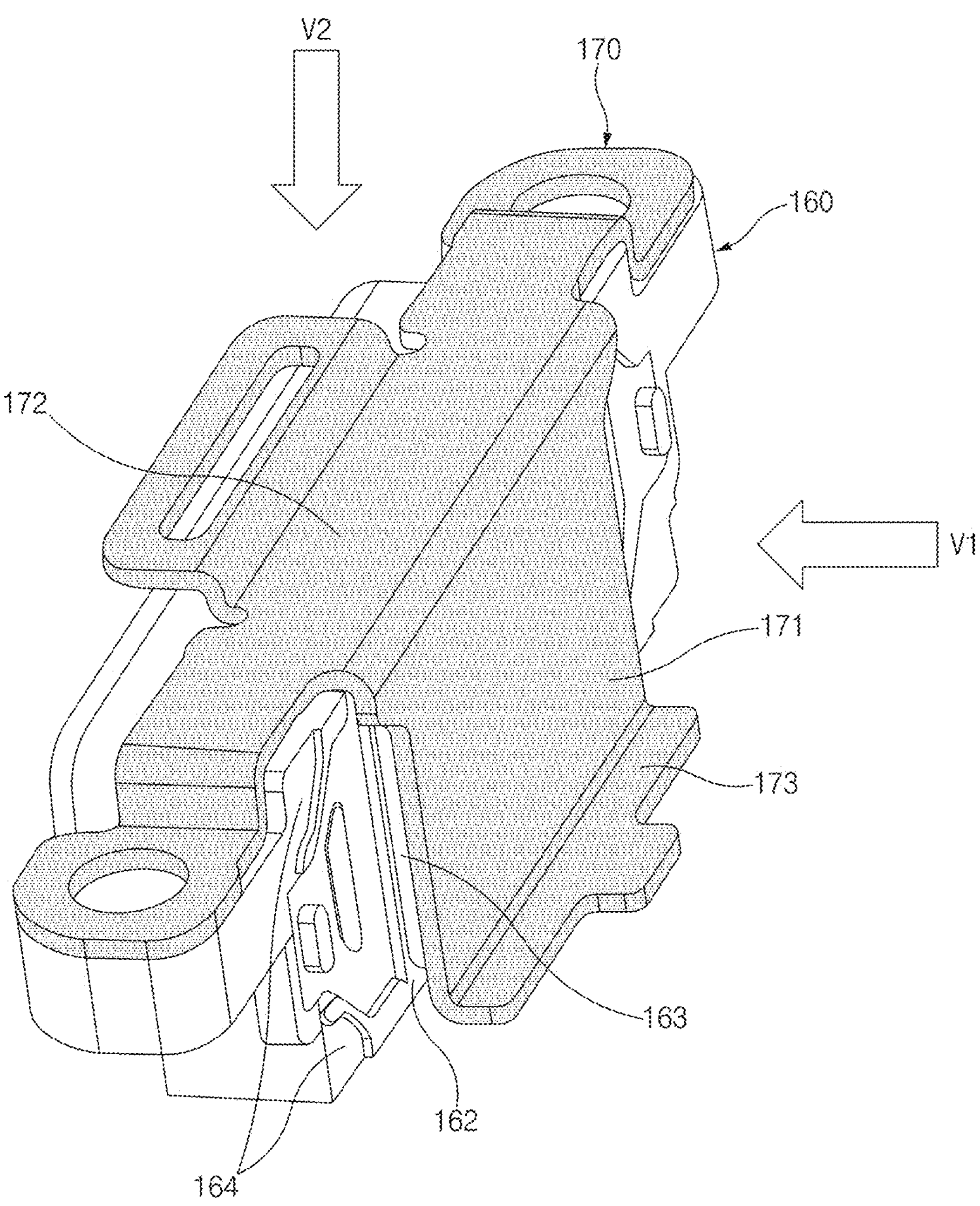
FIG. 11 is a perspective view illustrating a speaker module and a support member of an electronic device according to various embodiments
Figure 12A:
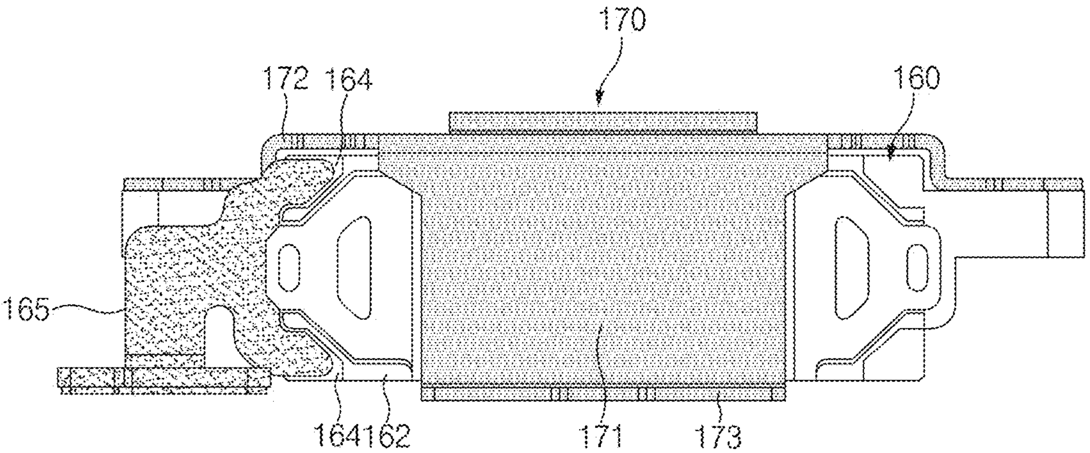
FIG. 12A is a diagram illustrating the speaker module and the support member of the electronic device according to various embodiments.
Figure 12B:
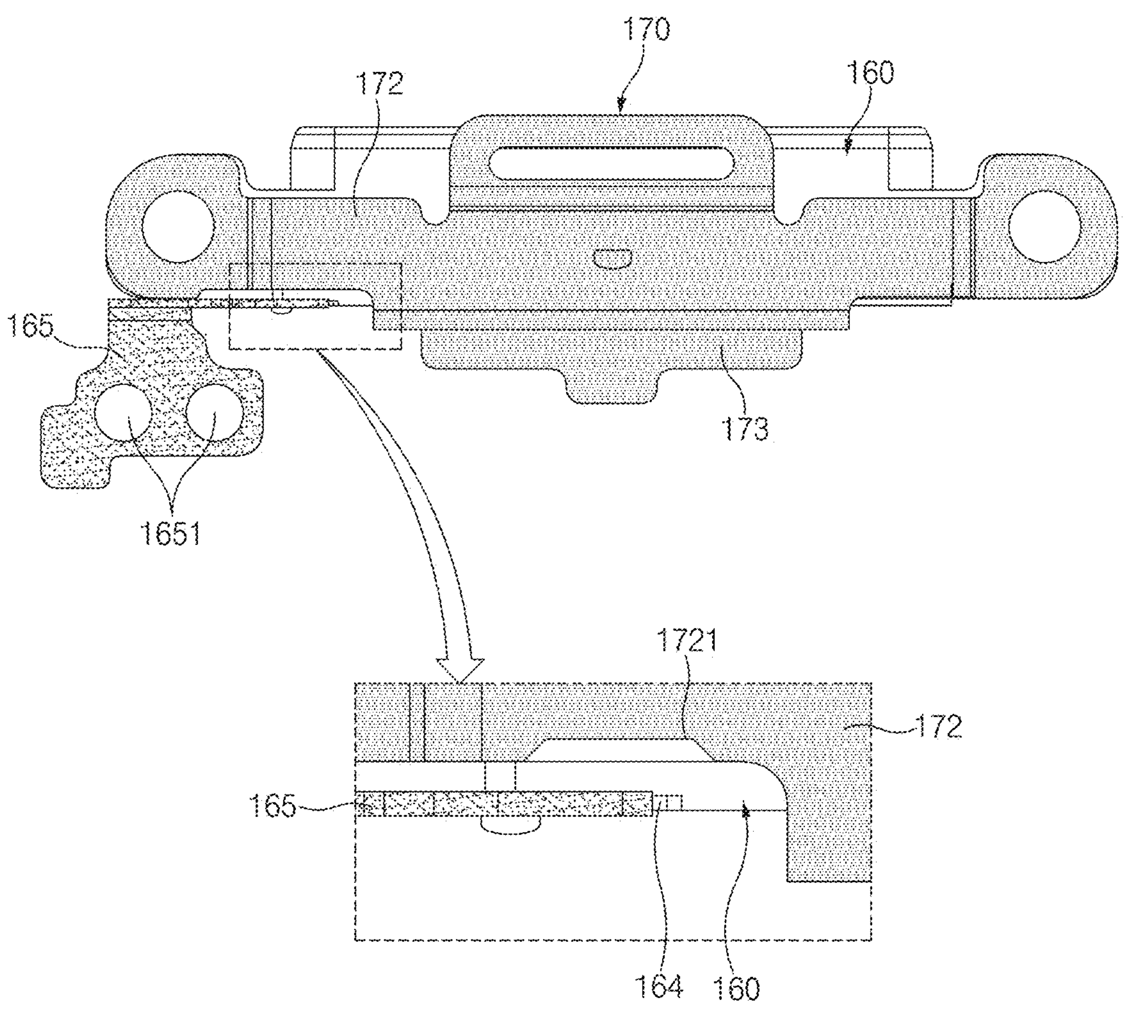
FIG. 12B is a diagram illustrating the speaker module and the support member of the electronic device according to various embodiments.

FIG. 11 is a perspective view illustrating a speaker module and a support member of an electronic device according to various embodiments. FIG. 12A is a diagram illustrating the speaker module and the support member of the electronic device according to various embodiments. FIG. 12B is a diagram illustrating the speaker module and the support member of the electronic device according to various embodiments.

FIG. 12A may be a view of a speaker module 160 and a support member 170 shown in FIG. 11 when viewed in a side direction V1, and FIG. 12B may be a view of the speaker module 160 and the support member 170 shown in FIG. 11 when viewed in a top direction V2.

Referring to FIGS. 11, 12A, and 12B, an electronic device 100 according to an embodiment may include a connecting member 165 for connecting the speaker module 160 and a circuit board 150.

In an embodiment, the speaker module 160 may be coupled to the support member 170, and a conductive member 163 may be disposed between a second side surface 162 of the speaker module 160 and the support member 170.

In an embodiment, the connecting region 164 to which the connecting member 165 is connected may be formed in a portion of the second side surface 162 of the speaker module 160. For example, the connecting region 164 may be formed by recessing at least a portion of the second side surface 162. The connecting member 165 may be electrically and/or physically connected to the connecting region 164. For example, the connecting region 164 may be connected to the connecting member 165 through a soldering process, but the disclosure is not limited thereto.

In an embodiment, the connecting region 164 may not overlap the support member 170. For example, when viewing the support member 170 and the speaker module 160 in the side direction V1, the connecting region 164 may be positioned so as not to overlap a base portion 171 of the support member 170. The connecting region 164 may be formed spaced apart from a first extension portion 172 of the support member 170 so as not to overlap the base portion 171 of the support member 170. For example, when viewing the support member 170 and the speaker module 160 in the side direction V1, the connecting region 164 may be positioned so as not to overlap the first extension portion 172 of the support member 170.

In an embodiment, the connecting member 165 may connect the speaker module 160 and the circuit board 150 to each other for the operation of the speaker module 160. Although not illustrated, a processor (for example, the processor 220 of FIG. 16) may be disposed on the circuit board 150 for controlling the speaker module 160, and the processor may be operatively connected to the speaker module 160 through the connecting member 165. The connecting member 165 may include at least one signal line for the operating of the speaker module 160. For example, the speaker module 160 may receive an electrical signal from the processor through the connecting member 165.

In an embodiment, the connecting member 165 may be connected to the connecting region 164 of the speaker module 160, and may extend toward the circuit board 150. For example, at least a portion (e.g., a conductive region 1651) of the connecting member 165 may electrically contact a C-clip disposed on the circuit board 150. The connecting member 165 may include a printed circuit board (PCB), a flexible PCB (FPCB), or a rigid-flexible PCB (RFPCB).

In an embodiment, the connecting member 165 may be positioned spaced apart from the support member 170 at a predetermined interval. The connecting member 165 may be connected to the connecting region 164 with the predetermined interval secured so as not to contact the support member 170. For example, the connecting member 165 is disposed so as not to contact the support member 170, and thereby an electrical short may be prevented/reduced from occurring in the support member 170 formed of the conductive material.

In an embodiment, the connecting member 165 may be spaced apart from the first extension portion 172 of the support member 170 at a predetermined interval when the support member 170 and the speaker module 160 are viewed in the side direction V1. For example, a cutout region 1721

(e.g., c-cut) may be formed in the first extension portion 172 of the support member 170 to secure an interval with the connecting member 165.

Figure 13:
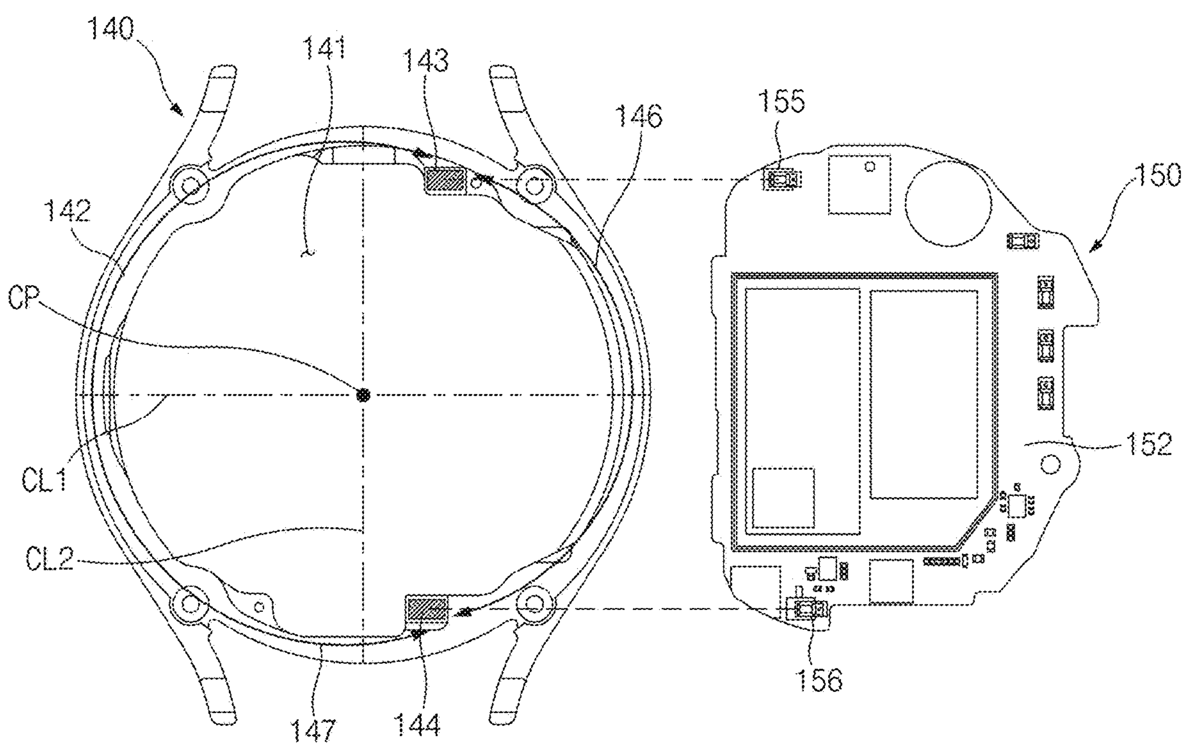
FIG. 13 is a diagram illustrating a side member and a circuit board of an electronic device according to various embodiments.
Figure 14:
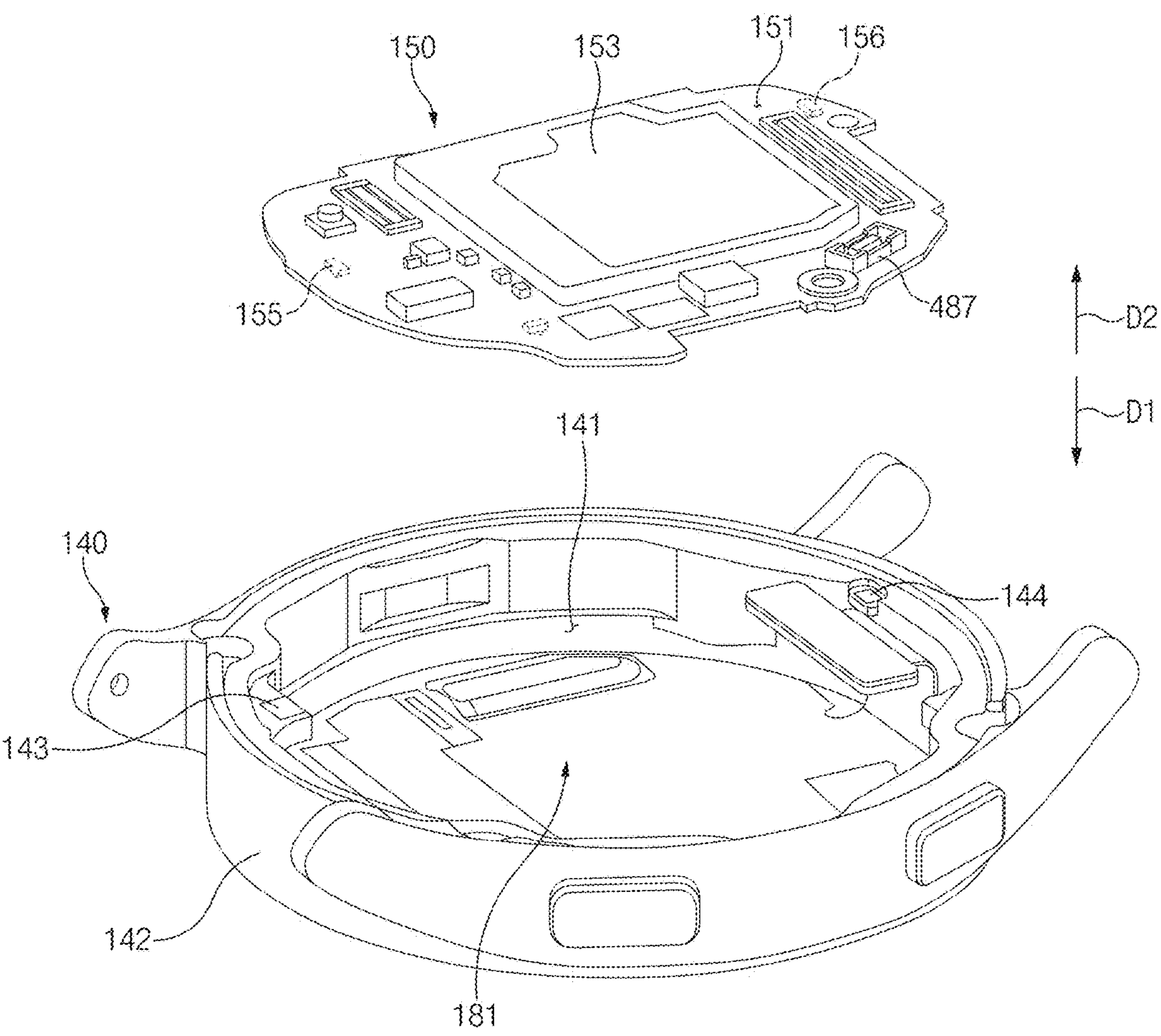
FIG. 14 is a partial exploded perspective view illustrating the side member and the circuit board of the electronic device according to various embodiments.

FIG. 13 is a diagram illustrating a side member and a circuit board of an electronic device according to various embodiments. FIG. 14 is a partial exploded perspective view illustrating the side member and the circuit board of the electronic device according to various embodiments.

With reference to FIGS. 13 and 14, an electronic device 100 according to an embodiment may utilize at least a portion of a housing 110 as an antenna. For example, at least a portion of a side member 140 of the housing 110 may operate as an antenna for transmitting and/or receiving radio signals, and for this purpose, at least a portion of the side member 140 may be electrically connected to a circuit board 150. The side member 140 may partially include a conductive material (e.g., metal).

In an embodiment, the side member 140 may include a sidewall 142 forming at least a portion of a side surface (e.g., the side surface 110C of FIGS. 1 and 2) of the electronic device 100. The sidewall 142 may extend to have a thickness specified in a height direction of the electronic device 100 (e.g., the first direction D1 or the second direction D2). The sidewall 142 may surround an opening 141 of the side member 140.

In an embodiment, the side member 140 may include a first portion 143 and/or a second portion 144 formed on one side of the sidewall 142. The first portion 143 and/or the second portion 144 may protrude or extend from a portion of the sidewall 142 toward the inside of the opening 141. For example, the first portion 143 and/or the second portion 144 may protrude from a rim portion of the sidewall 142 in the second direction D2.

In an embodiment, the first portion 143 and/or the second portion 144 may be formed at positions that are symmetric about a first center line CL1 of the sidewall 142 extending though a center point (CP). The first portion 143 and/or the second portion 144 may be formed on the right side of a second center line CL2 extending through the center point CP and perpendicular to the first center line CL1 when viewed from the side member 140 in the second direction D2. For example, referring to FIG. 13, a length of a portion (e.g., the first edge portion 146) of the sidewall 142 extending clockwise from the first portion 143 to the second portion 144 may be shorter than a length of a portion (e.g., the second edge portion 147) extending counterclockwise from the first portion 143 to the second portion 144.

In an embodiment, the side member 140 may be fed with electric power in the first portion 143 and grounded in the second portion 144, so that the side member 140 may operate as an antenna for transmitting and receiving radio signals.

In an embodiment, the first portion 143 of the side member 140 may contact a second connector 155 disposed on a second surface 152 of the circuit board 150. A wireless communication circuit or a wireless communication module (e.g., the wireless communication module 292 of FIG. 16) may be disposed on the circuit board 150. The wireless communication module may be electrically connected to the first portion 143 of the side member 140 through a transmission line formed on the circuit board 150 and the second connector 155 electrically connected to the transmission line. For example, the second connector 155 may include a C-clip or an SMD conductive gasket, but the disclosure is not limited thereto, and the second connector 155 may be implemented using various electrically connectable parts.

In an embodiment, the second portion 144 of the side member 140 may contact a third connector 156 disposed on the second surface 152 of the circuit board 150. The second portion 144 of the side member 140 may be electrically connected to a ground area (or ground plane) of the circuit board 150 through the third connector 156. For example, the third connector 156 may include a C-clip or an SMD conductive gasket, but the disclosure is not limited thereto, and the third connector 156 may be implemented using various electrically connectable parts.

In an embodiment, the side member 140 may form a first resonant frequency corresponding to a first specified band (e.g., a low-band (LB) of less than about 1 GHz) and a second resonant frequency corresponding to a second specified band (e.g., a mid-band (MB) of about 1 GHz to about 2.3 GHz). However, the first specified band and the second specified band are not limited to the above example.

In an embodiment, the side member 140 may be fed with electric power in the first portion 143 and shorted to the ground area (or ground plane) in the second portion 144, so that, referring to FIG. 13, the side member 140 may form a band of the first resonant frequency and/or a band of the second resonant frequency using the length (or path) of the first edge portion 146 extending clockwise from the first portion 143 to the second portion 144 and/or the length (or path) of the second edge portion 147 extending counterclockwise from the first portion 143 to the second portion 144. The first resonant frequency and/or the second resonant frequency may vary depending on respective circumferential lengths of the first edge portion 146 and the second edge portion 147 of the side member 140 divided based on the first portion 143 and the second portion 144.

In an embodiment, the wireless communication module may transmit/receive radio signals of the first specified band and the second specified band by feeding electric power to the first portion 143 of the side member 140.

Figure 15:
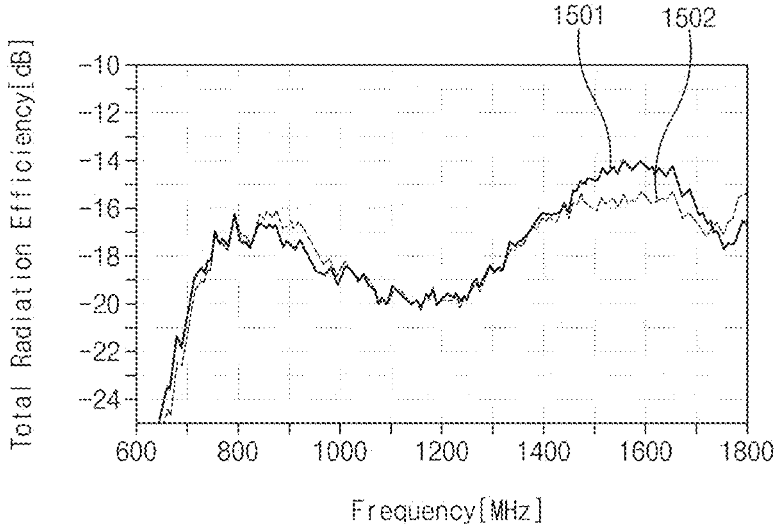
FIG. 15 is a graph showing total radiation efficiency of the electronic device according to various embodiments and an electronic device according to a comparative embodiment.

FIG. 15 is a graph illustrating total radiation efficiency of an electronic device according to an embodiment and an electronic device according to a comparative embodiment.

In FIG. 15, reference numeral 1501 is a graph showing the radiation efficiency of the electronic device (e.g., the electronic device 100 of FIGS. 1 to 4 and 8) according to an embodiment (e.g., first embodiment), and the electronic device 100 according to the first embodiment may be an electronic device configured such that the support member 170 is electrically connected to the circuit board 150 (e.g., the ground area) to operate as a ground, according to various embodiments of the disclosure.

In FIG. 15, reference numeral 1502 is a graph showing the radiation efficiency of the electronic device according to a comparative embodiment (e.g., second embodiment), and unlike the electronic device 100 according to the first embodiment, in the electronic device according to the comparative embodiment, the support member 170 may not be electrically connected to the circuit board 150 (e.g., the ground area). For example, the electronic device according to the second embodiment may have a relatively smaller ground area than the electronic device according to the first embodiment.

Referring to FIG. 15, as the support member 170 is electrically connected to the ground area of the circuit board 150, the electronic device 100 according to the first embodiment may have a larger ground area of the antenna than that of the electronic device 100 according to the second embodiment, thereby improving antenna performance.

The electronic device 100 according to the first embodiment may stably transmit and/or receive a signal of a target frequency band using the larger ground area. For example, in a certain frequency band, radiation efficiency 1501 of the electronic device 100 according to the first embodiment may be improved more than radiation efficiency 1502 of the electronic device according to the second embodiment. As illustrated in FIG. 15, in the band of about 1300 MHz to 1800 MHz, the radiation efficiency 1501 of the electronic device 100 according to the first embodiment may be higher than the radiation efficiency 1502 of the electronic device according to the second embodiment.

FIG. 16 is a block diagram illustrating an example electronic device in a network environment according to various embodiments.

Referring to FIG. 16, the electronic device 201 in the network environment 200 may communicate with an electronic device 202 via a first network 298 (e.g., a short-range wireless communication network), or at least one of an electronic device 204 or a server 208 via a second network 299 (e.g., a long-range wireless communication network). According to an embodiment, the electronic device 201 may communicate with the electronic device 204 via the server 208. According to an embodiment, the electronic device 201 may include a processor 220, memory 230, an input module 250, a sound output module 255, a display module 260, an audio module 270, a sensor module 276, an interface 277, a connecting terminal 278, a haptic module 279, a camera module 280, a power management module 288, a battery 289, a communication module 290, a subscriber identification module (SIM) 296, or an antenna module 297. In various embodiments, at least one of the components (e.g., the connecting terminal 278) may be omitted from the electronic device 201, or one or more other components may be added in the electronic device 201. In various embodiments, some of the components (e.g., the sensor module 276, the camera module 280, or the antenna module 297) may be implemented as a single component (e.g., the display module 260).

The processor 220 may execute, for example, software (e.g., a program 240) to control at least one other component (e.g., a hardware or software component) of the electronic device 201 coupled with the processor 220, and may perform various data processing or computation. According to an embodiment, as at least part of the data processing or computation, the processor 220 may store a command or data received from another component (e.g., the sensor module 276 or the communication module 290) in volatile memory 232, process the command or the data stored in the volatile memory 232, and store resulting data in non-volatile memory 234. According to an embodiment, the processor 220 may include a main processor 221 (e.g., a central processing unit (CPU) or an application processor (AP)), or an auxiliary processor 223 (e.g., a graphics processing unit (GPU), a neural processing unit (NPU), an image signal processor (ISP), a sensor hub processor, or a communication processor (CP)) that is operable independently from, or in conjunction with, the main processor 221. For example, when the electronic device 201 includes the main processor 221 and the auxiliary processor 223, the auxiliary processor 223 may be adapted to consume less power than the main processor 221, or to be specific to a specified function. The auxiliary processor 223 may be implemented as separate from, or as part of the main processor 221.

The auxiliary processor 223 may control at least some of functions or states related to at least one component (e.g., the display module 260, the sensor module 276, or the communication module 290) among the components of the electronic device 201, instead of the main processor 221 while the main processor 221 is in an inactive (e.g., sleep) state, or together with the main processor 221 while the main processor 221 is in an active state (e.g., executing an application). According to an embodiment, the auxiliary processor 223 (e.g., an image signal processor or a communication processor) may be implemented as part of another component (e.g., the camera module 280 or the communication module 290) functionally related to the auxiliary processor 223. According to an embodiment, the auxiliary processor 223 (e.g., the neural processing unit) may include a hardware structure specified for artificial intelligence model processing. An artificial intelligence model may be generated by machine learning. Such learning may be performed, e.g., by the electronic device 201 where the artificial intelligence is performed or via a separate server (e.g., the server 208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 230 may store various data used by at least one component (e.g., the processor 220 or the sensor module 276) of the electronic device 201. The various data may include, for example, software (e.g., the program 240) and input data or output data for a command related thereto. The memory 230 may include the volatile memory 232 or the non-volatile memory 234.

The program 240 may be stored in the memory 230 as software, and may include, for example, an operating system (OS) 242, middleware 244, or an application 246.

The input module 250 may receive a command or data to be used by another component (e.g., the processor 220) of the electronic device 201, from the outside (e.g., a user) of the electronic device 201. The input module 250 may include, for example, a microphone, a mouse, a keyboard, a key (e.g., a button), or a digital pen (e.g., a stylus pen).

The sound output module 255 may output sound signals to the outside of the electronic device 201. The sound output module 255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 260 may visually provide information to the outside (e.g., a user) of the electronic device 201. The display module 260 may include, for example, a display, a hologram device, or a projector and control circuitry to control a corresponding one of the display, hologram device, and projector. According to an embodiment, the display module 260 may include a touch sensor adapted to detect a touch, or a pressure sensor adapted to measure the intensity of force incurred by the touch.

The audio module 270 may convert a sound into an electrical signal and vice versa. According to an embodiment, the audio module 270 may obtain the sound via the input module 250, or output the sound via the sound output module 255 or a headphone of an external electronic device (e.g., an electronic device 202) directly (e.g., wiredly) or wirelessly coupled with the electronic device 201.

The sensor module 276 may detect an operational state (e.g., power or temperature) of the electronic device 201 or an environmental state (e.g., a state of a user) external to the electronic device 201, and then generate an electrical signal or data value corresponding to the detected state. According to an embodiment, the sensor module 276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 277 may support one or more specified protocols to be used for the electronic device 201 to be coupled with the external electronic device (e.g., the electronic device 202) directly (e.g., wiredly) or wirelessly. According to an embodiment, the interface 277 may include, for example, a high definition multimedia interface (HDMI), a universal serial bus (USB) interface, a secure digital (SD) card interface, or an audio interface.

A connecting terminal 278 may include a connector via which the electronic device 201 may be physically connected with the external electronic device (e.g., the electronic device 202). According to an embodiment, the connecting terminal 278 may include, for example, a HDMI connector, a USB connector, a SD card connector, or an audio connector (e.g., a headphone connector).

The haptic module 279 may convert an electrical signal into a mechanical stimulus (e.g., a vibration or a movement) or electrical stimulus which may be recognized by a user via his tactile sensation or kinesthetic sensation. According to an embodiment, the haptic module 279 may include, for example, a motor, a piezoelectric element, or an electric stimulator.

The camera module 280 may capture a still image or moving images. According to an embodiment, the camera module 280 may include one or more lenses, image sensors, image signal processors, or flashes.

The power management module 288 may manage power supplied to the electronic device 201. According to an embodiment, the power management module 288 may be implemented as at least part of, for example, a power management integrated circuit (PMIC).

The battery 289 may supply power to at least one component of the electronic device 201. According to an embodiment, the battery 289 may include, for example, a primary cell which is not rechargeable, a secondary cell which is rechargeable, or a fuel cell.

The communication module 290 may support establishing a direct (e.g., wired) communication channel or a wireless communication channel between the electronic device 201 and the external electronic device (e.g., the electronic device 202, the electronic device 204, or the server 208) and performing communication via the established communication channel. The communication module 290 may include one or more communication processors that are operable independently from the processor 220 (e.g., the application processor (AP)) and supports a direct (e.g., wired) communication or a wireless communication. According to an embodiment, the communication module 290 may include a wireless communication module 292 (e.g., a cellular communication module, a short-range wireless communication module, or a global navigation satellite system (GNSS) communication module) or a wired communication module 294 (e.g., a local area network (LAN) communication module or a power line communication (PLC) module). A corresponding one of these communication modules may communicate with the external electronic device via the first network 298 (e.g., a short-range communication network, such as Bluetooth™, wireless-fidelity (Wi-Fi) direct, or infrared data association (IrDA)) or the second network 299 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 292 may identify and authenticate the electronic device 201 in a communication network, such as the first network 298 or the second network 299, using subscriber information (e.g., international mobile subscriber identity (IMSI)) stored in the subscriber identification module 296.

The wireless communication module 292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 292 may support a high-frequency band (e.g., the mmWave band) to achieve, e.g., a high data transmission rate. The wireless communication module 292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 292 may support various requirements specified in the electronic device 201, an external electronic device (e.g., the electronic device 204), or a network system (e.g., the second network 299). According to an embodiment, the wireless communication module 292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 297 may transmit or receive a signal or power to or from the outside (e.g., the external electronic device) of the electronic device 201. According to an embodiment, the antenna module 297 may include an antenna including a radiating element including a conductive material or a conductive pattern formed in or on a substrate (e.g., a printed circuit board (PCB)). According to an embodiment, the antenna module 297 may include a plurality of antennas (e.g., array antennas). In such a case, at least one antenna appropriate for a communication scheme used in the communication network, such as the first network 298 or the second network 299, may be selected, for example, by the communication module 290 (e.g., the wireless communication module 292) from the plurality of antennas. The signal or the power may then be transmitted or received between the communication module 290 and the external electronic device via the selected at least one antenna. According to an embodiment, another component (e.g., a radio frequency integrated circuit (RFIC)) other than the radiating element may be additionally formed as part of the antenna module 297.

According to various embodiments, the antenna module 297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 201 and the external electronic device 204 via the server 208 coupled with the second network 299. Each of the electronic devices 202 or 204 may be a device of a same type as, or a different type, from the electronic device 201. According to an embodiment, all or some of operations to be executed at the electronic device 201 may be executed at one or more of the external electronic devices 202, 204, or 208. For example, if the electronic device 201 should perform a function or a service automatically, or in response to a request from a user or another device, the electronic device 201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 201. The electronic device 201 may provide the outcome, with or without further processing of the outcome, as at least part of a reply to the request. To that end, a cloud computing, distributed computing, mobile edge computing (MEC), or client-server computing technology may be used, for example. The electronic device 201 may provide ultra low-latency services using, e.g., distributed computing or mobile edge computing. In an embodiment, the external electronic device 204 may include an internet-of-things (IoT) device. The server 208 may be an intelligent server using machine learning and/or a neural network. According to an embodiment, the external electronic device 204 or the server 208 may be included in the second network 299. The electronic device 201 may be applied to intelligent services (e.g., smart home, smart city, smart car, or healthcare) based on 5G communication technology or IoT-related technology.

The wearable electronic device according to an example embodiment disclosed herein may include a housing including a front housing, a rear housing opposite to the front member, and a side housing surrounding an inner space between the front housing and the rear housing, a circuit board disposed in the housing and including at least one ground portion, the speaker module comprising a speaker disposed at one side of the rear housing and connected to the circuit board, and a support configured to support the speaker module and comprising a conductive material, wherein the support may be electrically connected to the ground portion of the circuit board.

In various example embodiments, the support may include a base portion configured to support one side of the speaker module, a first extension portion extending vertically from an upper end of the base portion, a second extension portion extending vertically from a lower end of the base portion, the first extension portion and the second extension portion may extend in opposite directions from the base portion, and at least a portion of the second extension portion may face the circuit board.

In various example embodiments, the circuit board may include a first surface facing the rear housing and a second surface a facing the front housing, wherein the second extension portion may be disposed to face the first surface of the circuit board and at least partially contact a first connector disposed on the first surface.

In various example embodiments, the first connector may be electrically connected to the ground portion of the circuit board, and the support may be electrically connected to the ground portion of the circuit board through the first connector.

In various example embodiments, the support may be coupled to the rear housing to partially wrap around the speaker module, and may contact a portion of the speaker module to bring the speaker module into close contact with an inner side of the rear member.

In various example embodiments, the rear housing may include a coupling portion to which the speaker module and the support are coupled, an accommodation space in which at least a portion of the speaker module is accommodated may be formed in the coupling portion, and the speaker module may be supported by the support to closely contact an edge portion of the accommodation space.

In various example embodiments, the rear housing may include the hooking structure in which the support is configured to be hooked, the hooking structure may include a hooking protrusion protruding from the coupling portion, and a hooking hole into which the hooking protrusion is inserted may be formed in the first extension portion of the support.

In various example embodiments, the hooking structure may further include a hooking groove recessed on one side of the rear housing, wherein at least a portion of the second extension portion of the support may be accommodated in the hooking groove to contact a step of the hooking groove.

In various example embodiments, the second extension portion may include a hooking portion hooked on the step of the hooking groove and a contact portion extending from the hooking portion, the hooking groove may include a first groove region corresponding to the hooking portion and a second groove region corresponding to the contact portion, wherein the contact portion may be accommodated in the second groove region to contact a first connector disposed on the circuit board.

In various example embodiments, the speaker module may include the first side surface in close contact with an inner side of the rear housing and a second side surface facing a direction opposite to the first side surface, a conductive member comprising a conductive material may be disposed between the support and the second side surface of the speaker module, wherein the support may be electrically connected to at least a portion of the speaker module through the conductive member.

In various example embodiments, the conductive member may be attached to the second side surface of the speaker module, and the support may be configured to support the speaker module by closely contacting the conductive member.

In various example embodiments, the wearable electronic device may further include a connecting member comprising a connector configured to connect the speaker module and the circuit board and a processor comprising processing circuitry disposed on the circuit board and operatively connected to the speaker module through the connecting member, and the connecting member may include at least one signal line configured to operate the speaker module.

In various example embodiments, the connecting member may be connected to one side surface of the speaker module and positioned spaced apart from the support at a specified interval, wherein the support member may be spaced apart from the connecting member to avoid an electrical short.

In various example embodiments, the wearable electronic device may further include a wireless communication circuit disposed on the circuit board, wherein the wireless communication circuit may be electrically connected to the side housing and configured to use at least a portion of the side housing as an antenna element.

In various example embodiments, the side housing may include a first portion and a second portion extending from a sidewall of the side housing to face at least a portion of the circuit board, the side housing may be configured such that the first portion is electrically connected to the wireless communication circuit and the second portion is electrically connected to the ground portion, and the wireless communication circuit may be configured to feed electric power to the side housing through the first portion.

In various example embodiments, the circuit board may include a first surface facing the rear housing and a second surface facing the front housing, the first portion and the second portion may be disposed to face the second surface of the circuit board, the first portion may contact a second connector disposed on the second surface, wherein the second portion may contact the third connector disposed on the second surface.

A wearable electronic device according to an example embodiment disclosed herein may include: a housing including a front housing facing a first direction, a rear housing facing a second direction opposite to the first direction, and a side housing surrounding an inner space between the front housing and the rear housing, the rear housing including a rear case and a cover coupled to the rear case; a display disposed inside the housing and visible in the first direction through the front housing; a circuit board disposed inside the housing and including at least one ground plane; a bracket disposed between the display and the rear case and on which a circuit board is seated; a speaker module comprising a speaker coupled to one side of the rear case and positioned in a space between the bracket and the rear case; and a support coupled to the rear case configured to support the speaker module and comprising a conductive material, wherein the support may contact at least a portion of the speaker module to bring the speaker module into close contact with an inner side of the rear case and be electrically connected to the ground plane of the circuit board.

In various example embodiments, the circuit board may include the first surface facing the second direction and a second surface facing the first direction, the support may include a base portion extending in the first direction and the second direction and supporting the side surface of the speaker module, a first extension portion extending vertically from an end portion of the base portion in the first direction, and a second extension portion extending vertically from the end portion of the base portion in the second direction, wherein the second extension portion may be disposed to partially face the first surface of the circuit board.

In various example embodiments, the circuit board may include a first connector disposed on the first surface and electrically connected to a ground plane of the circuit board, and the second extension portion may be electrically connected to the ground plane by contacting the first connector.

In various example embodiments, the wearable electronic device may further include: a wireless communication module comprising wireless communication circuitry disposed on the circuit board, the circuit board may include a second connector disposed on the second surface and electrically connected to the wireless communication module and a third connector disposed on the second surface and electrically connected to the ground plane, the side housing may include a first portion contacting the second connector and a second portion contacting the third connector, wherein the side housing may be fed with electric power in the first portion and grounded in the second portion.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 240) including one or more instructions that are stored in a storage medium (e.g., internal memory 236 or external memory 238) that is readable by a machine (e.g., the electronic device 201). For example, a processor (e.g., the processor 220) of the machine (e.g., the electronic device 201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A wearable electronic device comprising:

a housing including a front housing, a rear housing opposite to the front housing, and a side housing;

a circuit board disposed in the housing and including at least one ground portion;

an antenna;

a speaker module, comprising a speaker, disposed at one side of the rear housing and connected to the circuit board; and a support coupled to the rear housing and configured to support the speaker module, the support comprising a conductive material and electrically connected to the at least one ground portion of the circuit board to provide an extended ground area of the antenna.

2. The wearable electronic device of claim 1, wherein the support includes a base supporting one side of the speaker module, a first extension extending vertically from an upper end of the base, and a second extension extending vertically from a lower end of the base, the first extension and the second extension portion extend in opposite directions from the base, and at least a portion of the second extension portion faces the circuit board.

3. The wearable electronic device of claim 2, wherein the circuit board includes a first surface facing the rear housing and a second surface facing the front housing, and the second extension is disposed to face the first surface of the circuit board and at least partially contacts a first connector disposed on the first surface.

4. The wearable electronic device of claim 3, wherein the first connector is electrically connected to the at least one ground portion of the circuit board, and the support is electrically connected to the at least one ground portion of the circuit board through the first connector.

5. The wearable electronic device of claim 2, wherein the rear housing includes a coupling portion to which the speaker module and the support are coupled, the coupling portion includes an accommodation space in which at least a portion of the speaker module is accommodated, and the speaker module is supported by the support to closely contact an edge portion of the accommodation space.

6. The wearable electronic device of claim 5, wherein the rear housing includes a hook structure in which the support is hooked, the hook structure includes a hook protrusion protruding from the coupling portion, and the first extension of the support includes a hook hole into which the hook protrusion is inserted.

7. The wearable electronic device of claim 6, wherein the hook structure further includes a hook groove recessed on one side of the rear housing, and at least a portion of the second extension of the support is accommodated in the hook groove to contact a step of the hook groove.

8. The wearable electronic device of claim 7, wherein the second extension includes a hook hooked on the step of the hook groove and a contact portion extending from the hook portion, the hook groove includes a first groove region corresponding to the hook and a second groove region corresponding to the contact portion, and the contact portion is accommodated in the second groove region to contact a first connector disposed on the circuit board.

9. The wearable electronic device of claim 1, wherein the support is coupled to the rear housing and is configured to partially wrap around the speaker module, and contact a portion of the speaker module to bring the speaker module into close contact with an inner side of the rear housing.

10. The wearable electronic device of claim 1, wherein the speaker module includes a first side surface in close contact with an inner side of the rear housing and a second side surface facing a direction opposite to the first side surface, a conductive member comprising a conductive material disposed between the support and the second side surface of the speaker module, wherein the support is electrically connected to at least a portion of the speaker module through the conductive member.

11. The wearable electronic device of claim 10, wherein the conductive member may be attached to the second side surface of the speaker module, and the support may be configured to support the speaker module by closely contacting the conductive member.

12. The wearable electronic device of claim 1, further comprising:

a connector configured to connect the speaker module and the circuit board; and a processor comprising processing circuitry disposed on the circuit board and operatively connected to the speaker module through the connector, wherein the connector includes at least one signal line for operating the speaker module.

13. The wearable electronic device of claim 12, wherein the connector is connected to one side surface of the speaker module and positioned spaced apart from the support at a specified interval, wherein the support is spaced apart from the connector to avoid an electrical short.

14. The wearable electronic device of claim 1, further comprising a wireless communication circuit disposed on the circuit board, wherein the wireless communication circuit is electrically connected to the side housing and configured to use at least a portion of the side housing as the antenna.

15. The wearable electronic device of claim 14, wherein the side housing includes a first portion and a second extending from a sidewall of the side housing to face at least a portion of the circuit board, the side housing is configured such that the first portion is electrically connected to the wireless communication circuit and the second portion is electrically connected to the at least one ground portion, wherein the wireless communication circuit is configured to feed electric power to the side housing through the first portion.

16. The wearable electronic device of claim 15, wherein the circuit board includes a first surface facing the rear housing and a second surface facing the front housing, the first portion and the second portion are disposed to face the second surface of the circuit board, the first portion contacts a second connector disposed on the second surface, and the second portion contacts a third connector disposed on the second surface.

17. A wearable electronic device comprising:

a housing including a front housing facing a first direction, a rear housing facing a second direction opposite to the first direction, and a side frame, the rear housing including a rear case coupled to the side frame and a cover coupled to the rear case;

a display disposed inside the housing and visible in the first direction through the front housing;

a circuit board disposed inside the housing and including at least one ground plane;

an antenna;

a bracket disposed between the display and the rear case and on which the circuit board is seated;

a speaker module comprising a speaker coupled to one side of the rear case and positioned in a space between the bracket and the rear case; and a support coupled to the rear case and configured to support the speaker module in contact with an inner side of the rear case, the support comprising a conductive material and electrically connected to the ground plane of the circuit board to provide an extended ground area of the antenna.

18. The wearable electronic device of claim 17, wherein the circuit board includes a first surface facing the second direction and a second surface facing the first direction, the support includes a base extending in the first direction and the second direction and supporting a side surface of the speaker module, a first extension extending vertically from an end of the base in the first direction, and a second extension extending vertically from the end of the base in the second direction, wherein the second extension is disposed to partially face the first surface of the circuit board.

19. The wearable electronic device of claim 18, wherein the circuit board includes a first connector disposed on the first surface and electrically connected to a ground plane of the circuit board, and the second extension is electrically connected to the ground plane by contacting the first connector.

20. The wearable electronic device of claim 18, further comprising a wireless communication module comprising wireless communication circuitry disposed on the circuit board, the circuit board includes a second connector disposed on the second surface and electrically connected to the wireless communication module and a third connector disposed on the second surface and electrically connected to the ground plane, the side frame includes a first portion contacting the second connector and a second portion contacting the third connector, and the side frame is fed with electric power in the first portion and grounded in the second portion.

* * * * *